United States Patent
Wu et al.

(10) Patent No.: US 6,744,441 B2
(45) Date of Patent: Jun. 1, 2004

(54) THREE-DIMENSIONAL-PICTURE-GENERATING APPARATUS, THREE-DIMENSIONAL-PICTURE-GENERATING METHOD AND PROGRAM-PRESENTING MEDIUM

(75) Inventors: Weiguo Wu, Tokyo (JP); Atsushi Yokoyama, Kanagawa (JP); Hiroyuki Sato, Yamagata (JP)

(73) Assignee: Sony Corporation, Tokyo (JP)

( * ) Notice: Subject to any disclaimer, the term of this patent is extended or adjusted under 35 U.S.C. 154(b) by 146 days.

(21) Appl. No.: 09/898,342

(22) Filed: Jul. 3, 2001

(65) Prior Publication Data

US 2002/0061194 A1 May 23, 2002

(30) Foreign Application Priority Data

Jul. 3, 2000 (JP) ........................................ 2000-201033

(51) Int. Cl.$^7$ ................................................ G09G 5/00
(52) U.S. Cl. ........................ 345/582; 345/587; 345/589; 345/597; 345/598; 345/629
(58) Field of Search ................................ 345/587, 582, 345/589, 597, 598, 629

(56) References Cited

U.S. PATENT DOCUMENTS

| | | | | |
|---|---|---|---|---|
| 5,856,829 A | * | 1/1999 | Gray et al. .................. | 345/422 |
| 6,005,583 A | * | 12/1999 | Morrison ..................... | 345/587 |
| 6,009,190 A | * | 12/1999 | Szeliski et al. ............. | 382/154 |
| 6,236,405 B1 | * | 5/2001 | Schilling et al. ............ | 345/582 |
| 6,292,193 B1 | * | 9/2001 | Perry et al. .................. | 345/582 |
| 6,356,272 B1 | * | 3/2002 | Matsumoto et al. ........ | 345/582 |
| 6,571,024 B1 | * | 5/2003 | Sawhney et al. ............ | 382/294 |

OTHER PUBLICATIONS

Chen, S., et al., "View Interpolation for Image Synthesis", Computer Graphics Proceedings, Annual Conference Series, 1993, pp. 279–288.

Debevec, P., et al., "Modeling and Rendering Architecture from Photographs: A hybrid geometry– and image–based approach", Computer Graphics Proceedings, Annual Conference Series, 1996, pp. 11–20.

Sato, I., et al., "Seamless Integration of Computer Generated Objects into a Real Scene Based on a Real Illumination Distribution", Institute of Industrial Science, The University of Tokyo, Academic Society of Electronic, Information and Communication Engineers, D–II, vol. J81–D–II, No. 5, May 1998, pp. 861–871.

Horbelt, S., et al., "View–Dependent Texture Coding For Transmission of Virtual Environment",IEEE, IPA97, Conference Publication No. 443, Jul., 1997.

Sato, I., et al., "Estimation of illumination distribution by using soft shadows", Society of Information Processing Engineers, 98–CVIM–110, 1998, pp. 17–24.

* cited by examiner

*Primary Examiner*—Matthew C. Bella
*Assistant Examiner*—Manucher Rahmjoo
(74) *Attorney, Agent, or Firm*—Bell, Boyd & Lloyd LLC

(57) ABSTRACT

A texture picture with a highest resolution is selected among a plurality of pictures taken from different points of view for each patch surface, and texture mapping is carried out by pasting a texture picture selected for a patch surface on the patch surface. Then, processing is carried out to correct differences in concentration, which are caused by differences in beam-source condition, between pictures or between patch surfaces. As the correction processing, inter-frame picture-concentration-value correction, inter-patch texture-picture-shift correction and inter-patch boundary concentration smoothing correction are performed to allow texture mapping with a high picture quality to be carried out to produce a three-dimensional picture having a high quality. It is thus possible to provide a texture mapping technique capable of producing a three-dimensional picture having a high picture quality.

21 Claims, 17 Drawing Sheets

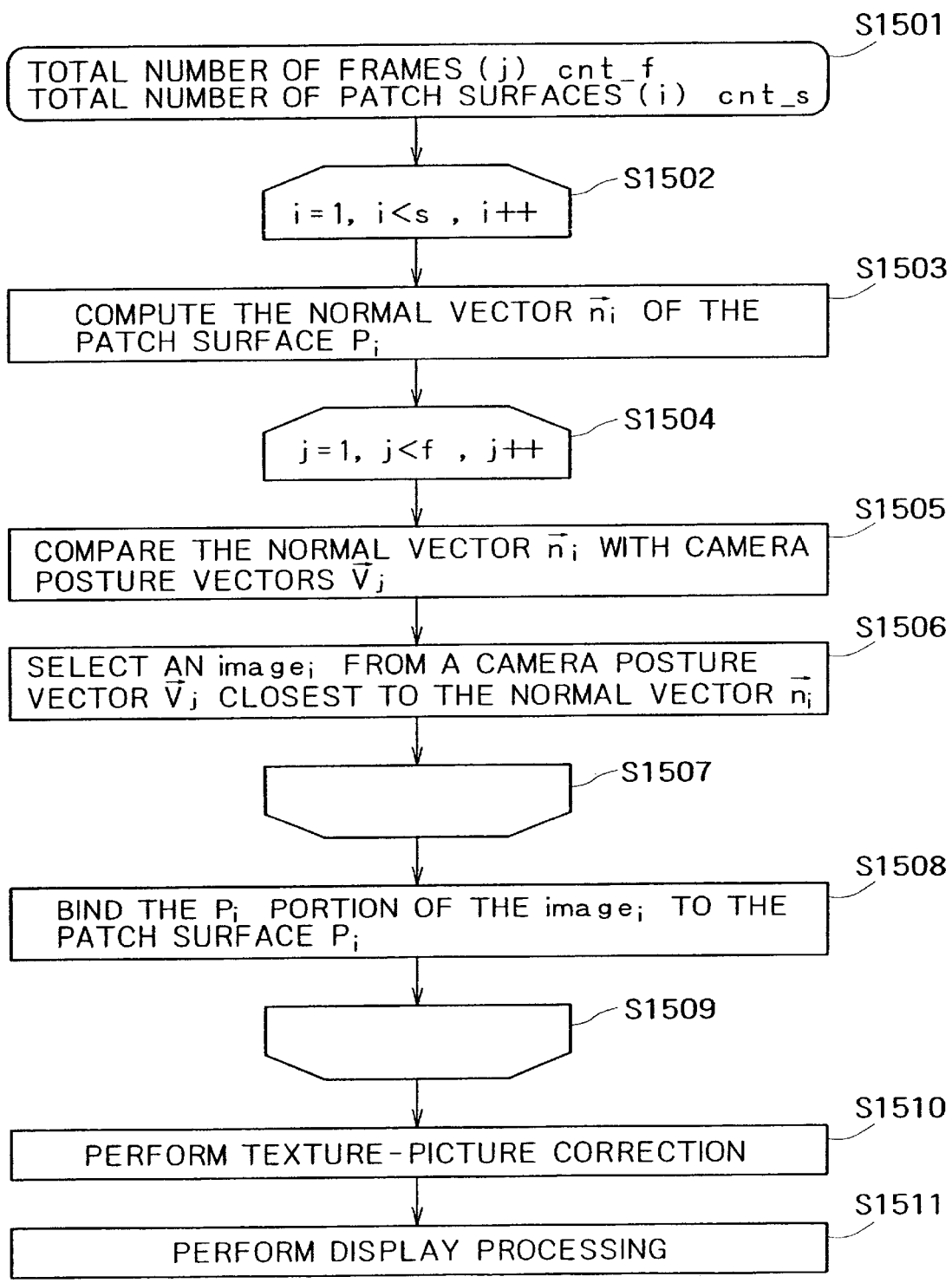

FRAME 1　FRAME 2　FRAME 3　FRAME 4　FRAME 15　FRAME 16

16 PICTURES USED IN TEXTURE MAPPING

VISUAL POINT 1　VISUAL POINT 2　VISUAL POINT 3

RESULTS OF TEXTURE MAPPING BY SELECTION OF A HIGH-RESOLUTION PICTURE FOR EACH PATCH

FIG. 17C RESULT OF MAPPING DONE FOR EACH PATCH SURFACE
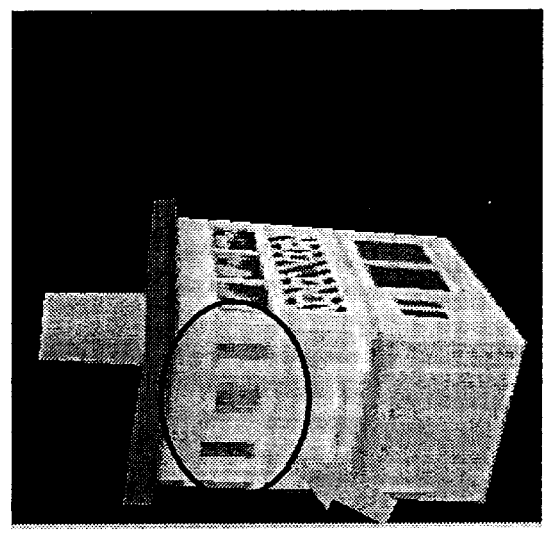
FIG. 17B RESULT OF MAPPING BY ADOPTING A SELECTION METHOD
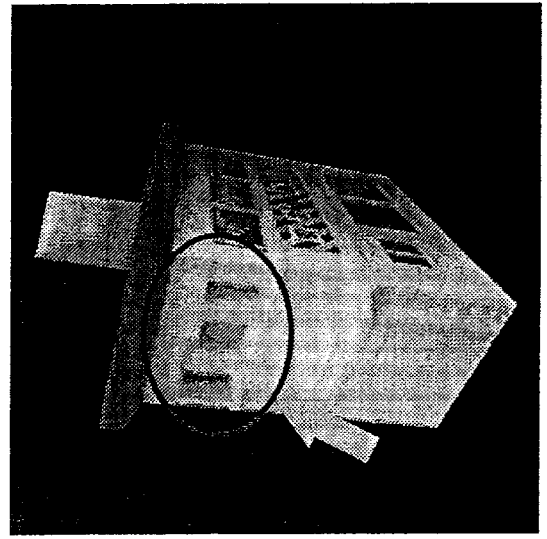
FIG. 17A RESULT OF MAPPING USING 1 PICTURE

THREE-DIMENSIONAL-PICTURE-GENERATING APPARATUS, THREE-DIMENSIONAL-PICTURE-GENERATING METHOD AND PROGRAM-PRESENTING MEDIUM

BACKGROUND OF THE INVENTION

In general, the present invention relates to a three-dimensional-picture-generating apparatus, a three-dimensional-picture-generating method and a program-presenting medium with regard to texture picture pasting techniques for three-dimentionally-shaped model. More particularly, the present invention relates to a three-dimensional-picture-generating apparatus and a three-dimensional-picture-generating method that are capable of generating a real three-dimensional picture with little unnaturalness by improving processing to paste texture pictures each taken at a virtual point of sight.

There are known measurement techniques applied to an object having a three-dimensional shape which is treated as an object of measurement. The measurement techniques include a method whereby a beam is radiated by a beam source to the object of measurement and a time it takes till a beam reflected by the object reaches the source is measured. In another measurement technique, a pattern beam having a slit shape is radiated to an object of measurement and the shape of the pattern beam projected on the object of measurement is inspected. In accordance with a further measurement technique known as a stereo picture method for measuring a distance, at least 2 cameras are used and a corresponding point between their pictures is identified to find a parallax in a measurement of a distance.

A picture reflecting actual colors of a measurement object is pasted on a three-dimensional model representing the measurement object's distance data obtained as a result of measurements using a variety of such methods to generate a real three-dimensional picture. An actual picture of the measurement object is called a texture picture. A process of pasting a texture picture on a three-dimensional shape is referred to as texture mapping.

In general, a picture pasted on a surface of a three-dimensional model is a two-dimensional bit-map picture or an image-file picture. A texture picture comprising a two-dimensional bit-map picture and an image-file picture is pasted and combined on a surface of a three-dimensionally-shaped model created by using a three-dimensional graphic technique or a surface of a substance's three-dimensional shape obtained by using a three-dimensional-shape measurement apparatus to display a three-dimensional substance. By pasting the picture of bricks on such a surface, for example, a natural three-dimensional wall can be expressed. By pasting a picture of a world map on a spherical body, a cubic earth can be expressed.

FIG. 1 is an explanatory diagram showing a general texture-mapping technique. A three-dimensionally-shaped model 101 shown in the figure is a model based on distance data obtained as a result of measurements using typically the stereo picture method described above or the like. A two-dimensional picture (a texture) 102 is a real picture reflecting visual-sense color data or the like obtained as a result of photographing from a certain point of vision. Texture mapping is a process of pasting the two-dimensional picture (the texture) 102 on the three-dimensionally-shaped model 101. By carrying out the texture-mapping process, a real three-dimensional expression is possible. It should be noted that a wire-frame display shown in the figure shows a planar area on which the texture obtained from the three-dimensionally-shaped model 101 is pasted.

So far, there have been studied a variety of technologies for pasting a texture picture on a substance's three-dimensional shape obtained by adoption of the stereo picture method or by using a three-dimensional measurement apparatus utilizing both a laser beam and a projection beam or the like. Assume that texture pictures seen from a plurality of visual points are pasted on corresponding areas of a measurement object. In this case, if the texture pictures are taken under different beam-source conditions, there will be differences in color tone among the texture pictures. The differences in color tone are caused by differences in beam-source condition which prevail when the texture pictures are taken individually. The differences in color tone result in an unnatural combination of colors in a picture if the resulting picture is produced by merely pasting the texture pictures. In order to solve this problem, there is provided a texture-mapping technique to produce a higher picture quality whereby beam-source conditions under which the texture pictures are taken are estimated, and the texture pictures are compensated for the differences in color tone on the basis of a result of the estimation. An example of such a technique is described in a reference authored by Imari Satoh, Youichi Satoh and Katsumi Ikeuchi with a title of "All-Azimuth Measurements of Beam-Source Environments and Superposition of Real Pictures on a Virtual Substance Based on Results of the Measurements," a thesis of the Academic Society of Electronic, Information and Communication Engineers D-II, Vol. J81-D-II, No. 5, pp. 861–871, 1998.

When a picture of outdoor scenery or a building is taken by using an apparatus such as a digital still camera or a digital video camera in general, however, the condition of a source radiating a beam is not easy to estimate. It is thus difficult to implement texture mapping to produce a high picture quality by using a plurality of taken pictures, that is, a plurality of texture pictures. In order to avoid unnaturalness caused by use of a plurality of texture pictures, for example, there is also provided a texture-mapping technique using only one texture picture as shown in FIG. 2. FIG. 2 is a diagram showing a configuration for implementing a texture-mapping process by pasting a particular picture of a proper area of a two-dimensional picture (texture picture) 202 on a wire frame of a three-dimensionally-shaped model 201.

With a technique of using only 1 particular picture as described above, however, there is raised a problem of a deteriorating texture picture quality caused by a change in point of vision. Assume for example that the acquired two-dimensional picture (texture picture) 202 is based on the picture of the front surface 203 of a cup shown in FIG. 2 and an end 204 thereof. In this case, there will be resulted in a difference in picture quality between the front surface 303 and the end 204 of the cup. This difference in picture quality causes deterioration of the picture quality.

As a technique of solving the deterioration of the picture quality described above, there is provided a method of selecting a texture picture taken from a photographing visual point closest to the virtual point of view and pasting the selected texture picture on a three-dimensionally-shaped model. This method is described by referring to FIG. 3. In the method shown in FIG. 3, a texture picture of a measurement object 301 is taken from a plurality of visual points, namely, photographing visual points 1 to n. If a virtual point of vision is set, a photographing visual point closest to the virtual visual point is selected, and a texture picture taken from the selected photographing visual point is pasted on a three-dimensionally-shaped model of the measurement object 301. In the example shown in FIG. 3, the RGB values of a virtual visual point are used as those of the photographing visual point 1 or 2. Notation θ1 denotes an angle formed by directions from the virtual visual point and the photographing visual point 1, whereas notation θ2 denotes an angle formed by directions from the virtual visual point and the photographing visual point 2. If θ1<θ2, the RGB values of the photographing visual point 1 are selected. If θ1>θ2, on the other hand, the RGB values of the photographing visual point 2 are selected. By adopting this method, the picture quality is improved. With this method, however, it is difficult to maintain concentration contiguity between pictures and, if the point of vision changes, unnaturalness of the picture results.

For a plurality of texture pictures usable for a surface, there has been a technique known as a VDTM (View-Dependent Texture Mapping) for expressing a real three-dimensional substance by carrying out a selection and synthesis process on a texture picture accompanying a movement of a visual point. This technique is described in a reference authored by Paul E. Debevec, Camillo J. Taylor and Jitendra Malik with a title of "Modeling and Rendering Architecture from Photographs: A hybrid geometry-and image-based approach," ACM SHIGGRAPH '96 Proceedings, pp. 11–20, 1996. This VDTM technique is different from the conventional CG technique of carrying out a texture-mapping process using a texture picture in that, with this VDTM technique, a change in visibility caused by a movement of a visual point for a portion irreproducible as a three-dimensional shape can be reproduced. With this VDTM technique, however, there is raised a problem of an increasing amount of picture data stored for improving the picture quality. In addition, the VDTM technique also imposes a limitation requiring that the conditions of the beam source for the texture pictures be unchanged.

In order to reduce the amount of picture data stored for improving the picture quality, there has been developed a mapping technique whereby only picture data of a visible portion is transmitted each time the point of vision changes. This technique is described in a reference authored by S. Horbelt, F. Jordan and T. Ebrahimi with a title of "View-Dependent Texture Coding for Transmission of Virtual Environment," Proceedings of the 1998 IEEE International Symposium on Circuits and Systems, Vol. 5, No. 6, pp. 498–501, 1998. However, this technique has a shortcoming that data is accessed with a low degree of efficiency due to the fact that data is transmitted each time the point of vision changes on the user side.

In addition, there are also provided techniques of interpolation among pictures. These techniques take advantage of association of a picture with another, which are taken at reconfiguration of a three-dimensional shape. These techniques are each proposed for reducing the amount of picture data. They are described in a reference authored by Shen-chang Eric Chen and Lance Williams with a title of "View Interpolation for Image Synthesis," ACM SHIGGRAPH '93 Proceedings, pp. 279–288, 1993 and a reference authored by S. Steven, M. Seitz and Charles R. Dyer with a title of "View Morphing," ACM SHIGGRAPH '96 Proceedings, pp. 21–30, 1996. With these methods, however, there is raised a problem of picture-quality deterioration and unnaturalness depending on the way a picture is taken at a photographing time.

In the mean time, there has been studied a method of correcting a difference in color tone among pictures by adoption of a technique of estimating conditions of a beam source that prevail at the time a texture picture is taken. The technique is described in a reference authored by Imari Satoh, Youichi Satoh and Katsumi Ikeuchi with a title of "Estimation of Real Radiation Conditions Based on Soft Shadows of a Real Substance," a research report of the Society of Information Processing Engineers, 98-CVIM-110, 1998. However, this method imposes a limitation that a substance determined on a picture must be moved in order to carry out correction processing. With this method, it is impossible to estimate conditions of a beam source for a picture taken in the open air.

SUMMARY OF THE INVENTION

In view of the foregoing, the present invention has been made, and an object of the present invention is to provide a three-dimensional-picture-generating apparatus and a three-dimensional-picture-generating method capable of providing a high-quality picture-mapping technique for improving the picture quality of a texture while decreasing an amount of picture data to be stored. To put it concretely, it is an object of the present invention to provide a three-dimensional-picture-generating apparatus and a three-dimensional-picture-generating method, which are capable of producing a three-dimensional expression with a high picture quality by applying a smoothing method and picture concentration correction of an image base without creating a model of a beam source; creating a texture picture using a picture with a highest resolution on each patch surface; and subjecting the picture created at the highest resolution to the smoothing method and the picture concentration correction to make differences in color tone between pictures less striking wherein the differences in color tone between pictures are caused by differences in beam-source conditions.

According to a first aspect of the present invention, there is provided a three-dimensional-picture-generating apparatus for generating a three-dimensional picture by pasting texture pictures on a three-dimensionally-shaped model, which provides for the selection of a picture with a highest resolution from among a number of pictures obtained as a result of photographing an object of measurement from different camera points of view for each of patch surfaces composing a three-dimensional picture; and a texture mapping function including applying the selected pictures to the respective patch surfaces as texture pictures.

In the three-dimensional-picture-generating apparatus, preferably the selection of a picture with a highest resolution among a number of pictures for any particular one of the patch surfaces involves a comparison of a normal vector of the particular patch surface with each of a number of photographing visual-point direction vectors; and may select a picture taken from a photographing visual-point direction forming a smallest angle with the normal vector of the particular patch surface.

Preferably, the three-dimensional-picture-generating apparatus may include a processor for carrying out processing to correct concentrations of a number of pictures taken from different camera photographing points of view, wherein the processing to correct concentrations is configured to compute an average and a variance of concentrations for each patch-surface unit or each set area unit of the pictures taken from different camera photographing points of view; and perform normalization.

Preferably, the three-dimensional-picture-generating apparatus may include a processor for carrying out processing to correct a texture-picture shift between patch surfaces, wherein the processing to correct a texture-picture shift is configured to compute a difference in concentration between adjacent patch surfaces on a border between the patch surfaces; detect the texture-picture shift; further divide each of the patch surfaces on the basis of the detected texture-picture shift; and perform re-mapping.

Preferably, the three-dimensional-picture-generating apparatus may include a processor for carrying out processing to correct a texture-picture shift between patch surfaces, wherein the processing to correct a texture-picture shift is configured to compute distributions of concentrations of adjacent patch surfaces on a border between the patch surfaces; and change coordinates of end points of either of the patch surfaces to coordinates that provide a minimum total sum of differences which is computed with respect to pixels on the distributions.

Preferably, the three-dimensional-picture-generating apparatus may include a processor for carrying out processing to correct a texture-picture shift between patch surfaces, wherein the processing to correct a texture-picture shift is configured to compute an error in concentration between each two adjacent patch surfaces on a border between the patch surfaces for a number of patch surfaces composing a three-dimensional picture; perform processing to correct a shift under a condition that an error is greater than a threshold value determined in advance for a largest value among a number of computed errors in concentrations; and complete said processing to correct a shift under a condition that errors in concentration which are computed between each two adjacent patch surfaces on a border between the patch surfaces for a number of patch surfaces composing a three-dimensional picture all do not exceed the threshold value.

Preferably, the three-dimensional-picture-generating apparatus may include a processor for carrying out processing to smooth concentrations on a border between patch surfaces, wherein the processing to smooth concentrations is configured to compare a normal vector of the particular patch surface with each of a number of photographing visual-point direction vectors; select a picture taken from a photographing visual-point direction forming a smallest angle with the normal vector of the particular patch surface; paste the selected picture on the particular patch surface; create as many texture development diagrams each comprising a texture picture pasted on a number of patch surfaces by superposition as a number of texture pictures pasted on patch surfaces; superpose the texture development diagrams on each other; and smooth concentrations of each of the patch surfaces.

According to second aspect of the present invention, there is provided a three-dimensional-picture-generating method for generating a three-dimensional picture by pasting texture pictures on a three-dimensionally-shaped model, which includes the steps of: selecting a picture with a highest resolution among a number of pictures obtained as a result of photographing an object of measurement from different camera points of view for each of patch surfaces composing a three-dimensional picture; and carrying out texture mapping by applying the selected pictures to the respective patch surfaces as texture pictures.

In the three-dimensional-picture-generating method, preferably, the step of selecting a picture with a highest resolution for any particular one of the patch surfaces may include the steps of: comparing a normal vector of the particular patch surface with each of a plurality of photographing visual-point direction vectors; and selecting a picture taken from a photographing visual-point direction forming a smallest angle with the normal vector of the particular patch surface.

Preferably, the three-dimensional-picture-generating method may include the step of carrying out processing to correct concentrations of a number of pictures taken from different camera photographing points of view, wherein the processing to correct concentrations is carried out by computing an average and a variance of concentrations for each patch-surface unit or each set area unit of the pictures taken from different camera photographing points of view and performing normalization.

Preferably, the three-dimensional-picture-generating method may include the step of carrying out processing to correct a texture-picture shift between patch surfaces, wherein the processing to correct a texture-picture shift is carried out by computing a difference in concentration between adjacent patch surfaces on a border between the patch surfaces; detecting the texture-picture shift; further dividing each of the patch surfaces on the basis of the detected texture-picture shift; and performing re-mapping.

Preferably, the three-dimensional-picture-generating method may include the step of carrying out processing to correct a texture-picture shift between patch surfaces, wherein the processing to correct a texture-picture shift is carried out by computing distributions of concentrations of adjacent patch surfaces on a border between the patch surfaces; and changing coordinates of end points of either of the patch surfaces to coordinates that provide a minimum total sum of differences which is computed with respect to pixels on said distributions.

Preferably, the three-dimensional-picture-generating method includes the step of carrying out processing to correct a texture-picture shift between patch surfaces, wherein the processing to correct a texture-picture shift is carried out by computing an error in concentration between each two adjacent patch surfaces on a border between the patch surfaces for a number of patch surfaces composing a three-dimensional picture; performing processing to correct a shift under a condition that an error is greater than a threshold value determined in advance for a largest value among a number of computed errors in concentrations; and completing said processing to correct a shift under a condition that errors in concentration which are computed between each two adjacent patch surfaces on a border between the patch surfaces for a number of patch surfaces composing a three-dimensional picture all do not exceed said threshold value.

Preferably, the three-dimensional-picture-generating method may include the step of carrying out processing to smooth concentrations on a border between patch surfaces, wherein the processing to smooth concentrations is carried out by comparing a normal vector of the particular patch surface with each of a number of photographing visual-point direction vectors; selecting a picture taken from a photographing visual-point direction forming a smallest angle with the normal vector of the particular patch surface; pasting the selected picture on the particular patch surface; creating as many texture development diagrams each comprising a texture picture pasted on a plurality of patch surfaces by superposition as a plurality of texture pictures pasted on patch surfaces; superposing the texture development diagrams on each other; and smoothing concentrations of each of the patch surfaces.

As described above, in the three-dimensional-picture-generating apparatus and three-dimensional-picturegenerating method in accordance with the present invention, a texture picture is created by using a picture with a highest resolution for each patch surface, and a concentration correction method as well as a smoothing method are applied to processing to correct differences in concentration, which are caused by differences in beam-source condition, between pictures or between patch surfaces. As a result, a texture mapping process producing a high picture quality can be carried out.

In addition, in the three-dimensional-picture-generating apparatus and three-dimensional-picture-generating method in accordance with the present invention, differences in concentration, that is, differences in RGB values, on each patch surface are corrected by carrying out correction processing based on concentration normalization and reference picture concentration interpolation for each patch surface to generate a texture picture. In addition, by adoption of a smoothing method based on picture superposition using development diagrams of patch surfaces, a joint or a boundary area between patch surfaces each pasted with a created texture picture can be made smooth.

According to a third aspect of the present invention, there is provided a program-presenting medium for presenting a formatted computer program to be executed by a computer system for generating a three-dimensional picture by pasting texture pictures on a three-dimensionally-shaped model, which computer program includes the steps of: selecting a picture with a highest resolution among a number of pictures obtained as a result of photographing an object of measurement from different camera points of view for each of patch surfaces composing a three-dimensional picture; and carrying out texture mapping by applying the selected pictures to the respective patch surfaces as texture pictures.

The program-presenting medium described above may be a medium which presents a computer program in a computer-readable format to a typical general-purpose computer system capable of executing a variety of program codes. The medium may be a recording medium such as a CD (Compact Disc), an FD (Floppy Disc) and an MO (Magneto-Optical) disc as well as transmission media such as a network. The type of the program-presenting medium is not specially restricted.

Such a program-presenting medium for presenting a computer program defines a structural or functional cooperative relation between a computer system and the program-presenting medium. The relation is used for implementing predetermined functions of the computer program in the computer system. In other words, by installing the computer program into the computer system through the program-presenting medium, the computer system is capable of displaying a cooperative effect, allowing the same effects as other aspects of the present invention to be obtained.

The above and other objects, features and advantages of the present invention as well as the manner of realizing them will become more apparent whereas the invention itself will be best understood from a careful study of the following detailed description and appended claims with reference to attached drawings showing the preferred embodiments of the invention.

BRIEF DESCRIPTION OF THE DRAWINGS

FIG. 15 shows a flowchart used for explaining processing carried out by the three-dimensional-picture-generating apparatus provided by the present invention to generate a three-dimensional picture;

FIG. 17 is a diagram showing results of comparison of a proposed texture mapping technique with techniques adopted so far.

DETAILED DESCRIPTION OF THE PREFERRED EMBODIMENTS

Figure 1:
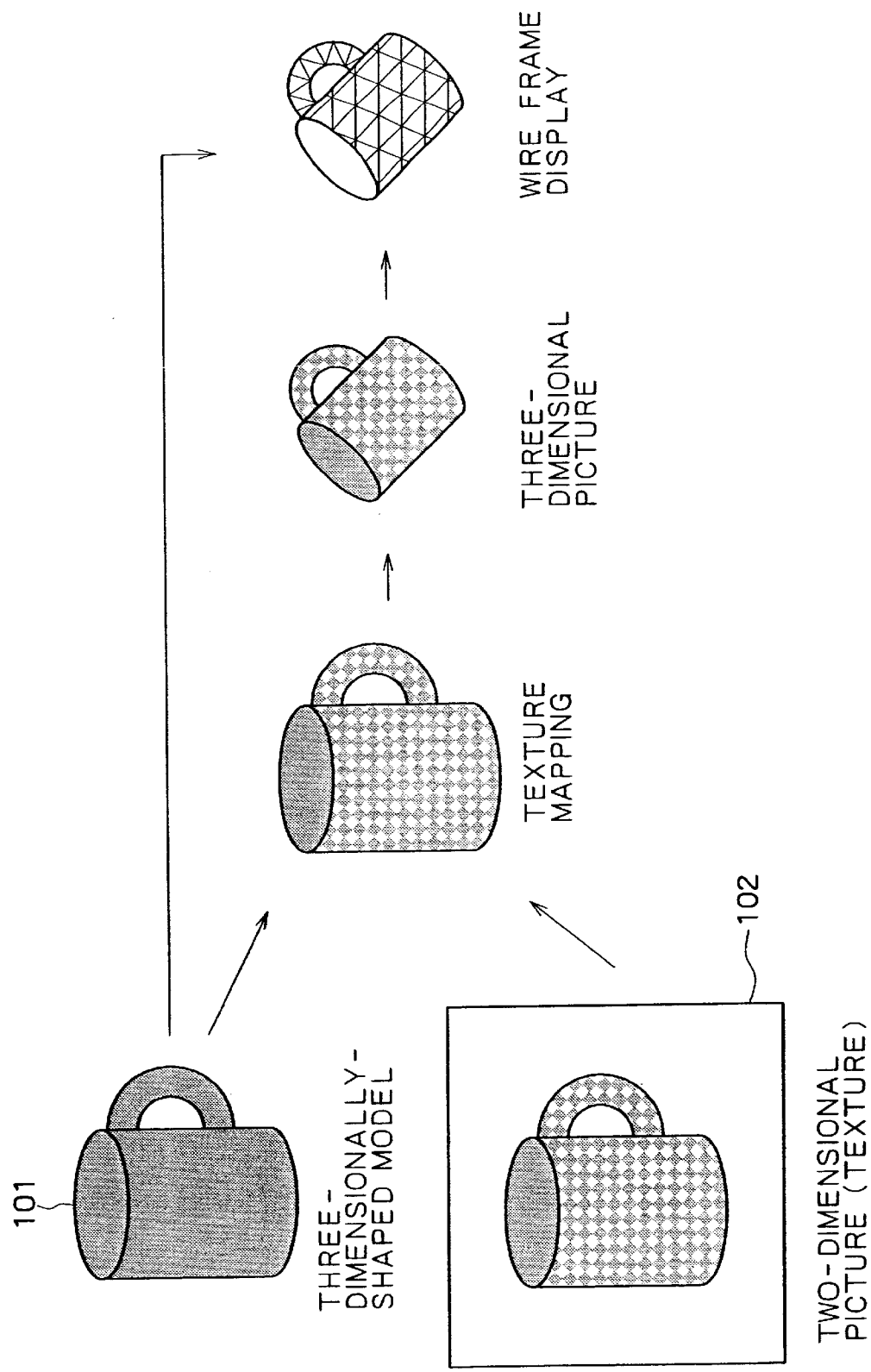
FIG. 1 is an explanatory diagram showing a general texture-mapping technique.
Figure 2:
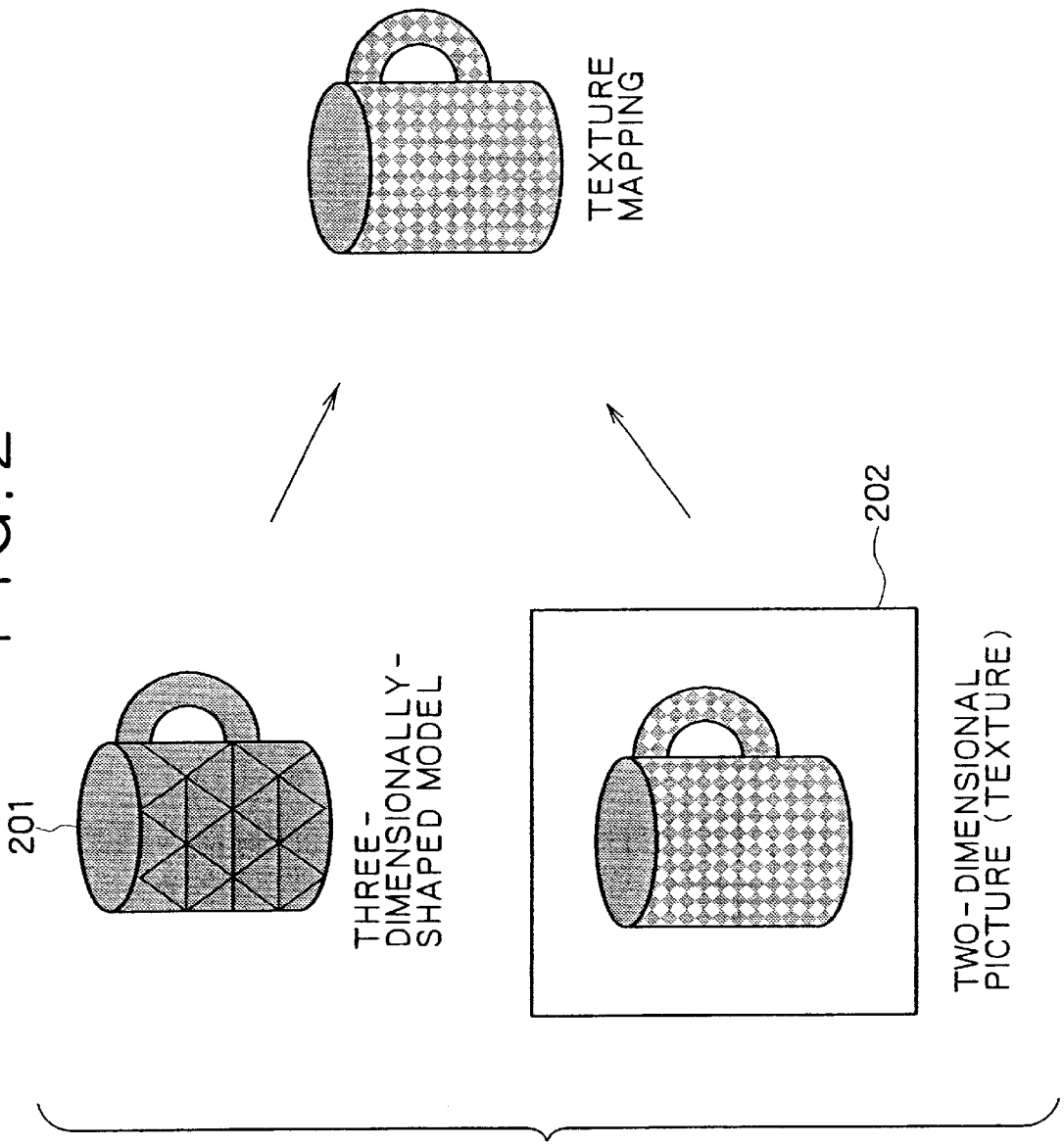
FIG. 2 is a diagram showing a configuration for implementing the conventional texture-mapping process carried out by pasting a particular picture of a proper area of a two-dimensional picture (texture picture) on a frame of a three-dimensionally-shaped model.
Figure 3:
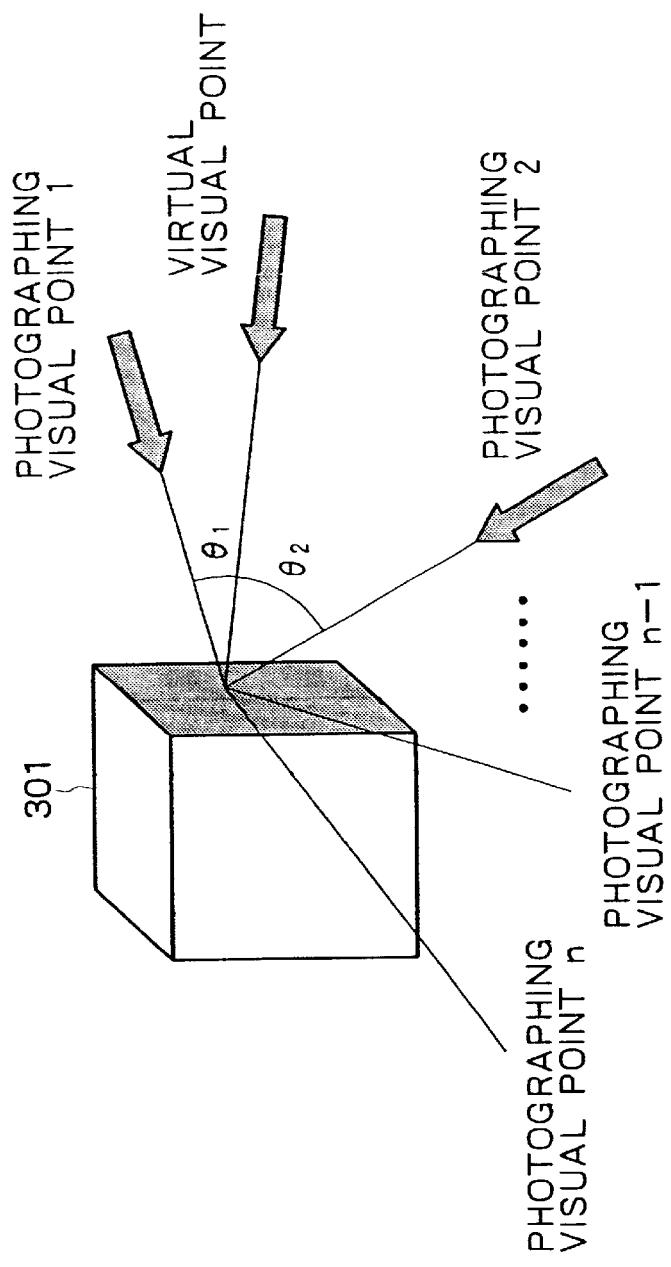
FIG. 3 is an explanatory diagram showing the mapping method of selecting a texture picture taken from a photographing visual point closest to the virtual point of view among a number of such texture pictures and pasting the selected texture picture on a three-dimensionally-shaped model.
Figure 4:
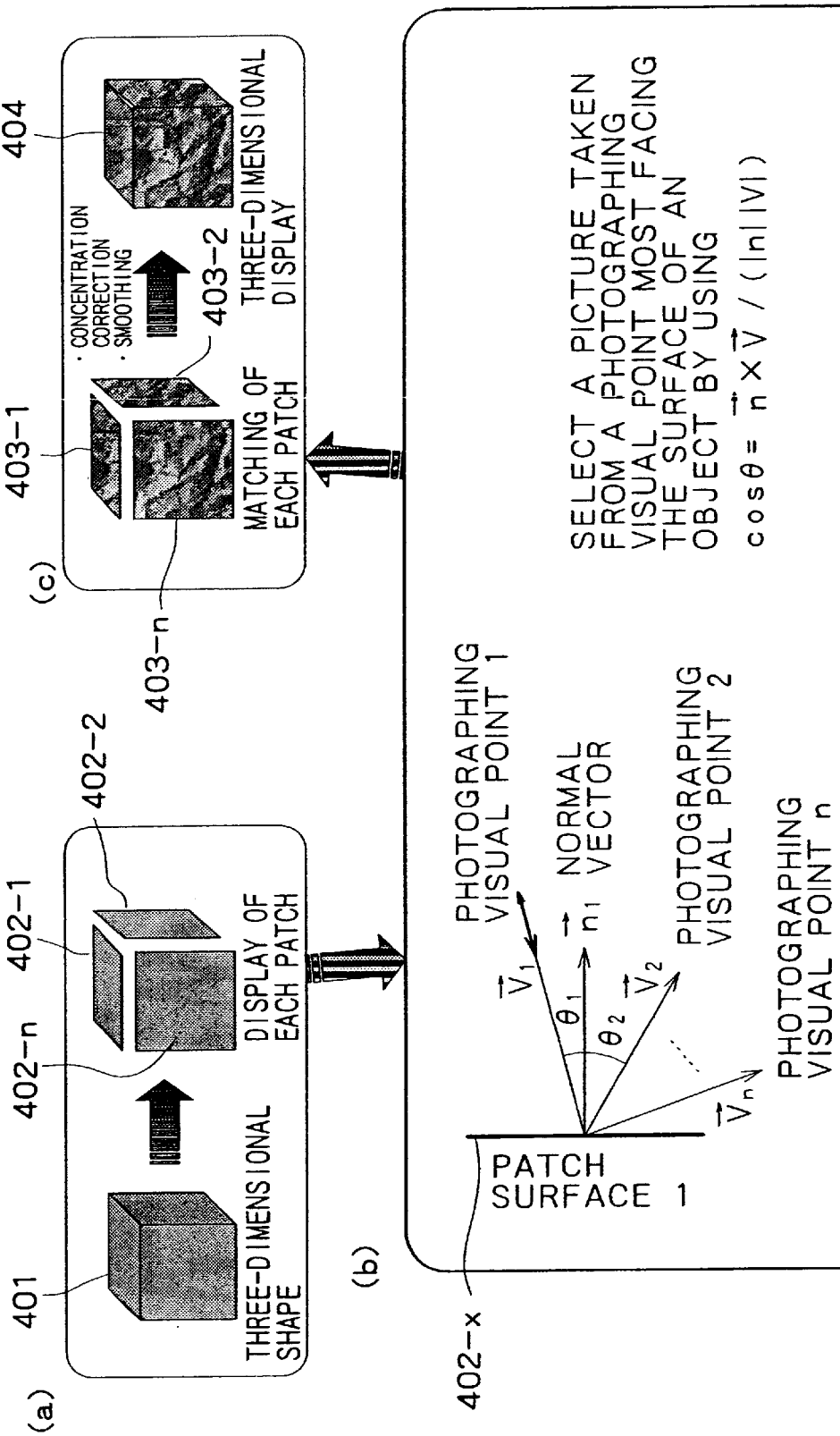
FIG. 4 is an explanatory diagram showing a texture-picture mapping process carried out by the three-dimensional-picture-generating apparatus according to the present invention by using a number of pictures.

Hereinafter, a three-dimensional-picture-generating apparatus and a three-dimensional-picture-generating method in accordance with the present invention are described in detail. The description begins with an overview of a texture-picture mapping process carried out by the three-dimensional-picture-generating apparatus according to the present invention with reference to FIG. 4.

In the texture-picture mapping process carried out by the three-dimensional-picture-generating apparatus of the present invention, a texture picture taken from a direction forming a smallest angle with a normal vector of a patch surface is selected from a plurality of texture pictures, e.g. n texture pictures, taken from different points of view for each patch surface of a measurement object 401.

First of all, a plurality of patch surfaces are selected from a taken texture picture of the measurement object 401 as shown in FIG. 4A. It should be noted that a patch surface is a surface graspable as a plane surface on which a texture picture is to be pasted. To be more specific, a plurality of patch surfaces 402-1 to 402-n are selected from a taken picture of the measurement object 401 as shown in FIG. 4A.

Then, a texture picture taken from a direction forming a smallest angle with a normal vector of a patch surface is selected from a number of texture pictures, e.g. n texture pictures 1 to n, having different points of view for each of the patch surfaces 402-1 to 402-n of the measurement object 401. An outline of a process of selecting a patch surface is shown in FIG. 4B. FIG. 4B is a diagram showing a typical selection process for the patch surface 402-x. FIG. 4B shows a normal vector of the patch surface 402-x and a plurality of photographing visual-point vectors V1 to Vn. A photographing visual-point vector Vi forming a smallest angle with the normal vector is selected. To put it in detail, a photographing visual-point vector Vi forming a smallest angle with the normal vector is selected by typically comparing values of cos θ where notation θ denotes an angle formed by the photographing visual-point vector Vi and the normal vector. The value of cos θ is computed by using Eq. (1) given as follows:

$$\cos\theta = \frac{\vec{n}\cdot\vec{V}}{|n||V|} \quad (1)$$

In this way, a texture picture taken from a direction forming a smallest angle with a normal vector of a patch surface is selected from a plurality of texture pictures having different points of vision for each of the patch surfaces 402-1 to 402-n of the measurement object 401. Then, as shown in FIG. 4C, by pasting the selected texture pictures 403-1 to 403-n on the patch surfaces 402-1 to 402-n respectively, a three-dimensional display 404 of the measurement object 401 is completed.

It should be noted that texture pictures pasted on patch surfaces may have been taken from different angles and under different photographing conditions. In addition, there may be discrepancies among adjacent pictures and differences in concentration among the pictures. Thus, when pasting texture pictures, it is necessary to carry out correction processing on each of the texture pictures.

The following describes correction processing carried out for processing to paste texture pictures taken from a plurality of visual points different from each other. The correction processing is classified into the following three categories:

a: Inter-frame picture-concentration-value correction b: Inter-patch texture-picture-shift correction c: Inter-patch boundary-concentration smoothing correction The (a) category, namely, the inter-frame picture-concentration-value correction, is processing to correct concentrations including RGB values among a number of texture pictures taken from different points of view. The (b) category, namely, the inter-patch texture-picture-shift correction, is processing to correct positional shifts of boundaries between patch surfaces each pasted with a texture picture. The (c) category, namely, the inter-patch boundary-concentration smoothing correction, is processing to correct concentrations existing on boundaries between patch surfaces each pasted with a texture picture. The correction values include RGB values. The (c) category is concentration correction processing for complementing the correction by the inter-frame picture-concentration-value correction of the (a) category. The (c) category is a smoothing process to make boundaries between different patch surfaces not striking. The processing categories are described sequentially one category after another as follows.

a: Inter-Frame Picture-Concentration-Value Correction

As described earlier, in order to produce a three-dimensional display, texture pictures of frames of a measurement object are taken from a plurality of photographing visual points different from each other. If there are n points of view, n photographed pictures or texture pictures are obtained. Since these n texture pictures have conditions of beam-source radiation different from each other, the photographed pictures may have different concentrations including RGB values even if the photographed pictures are pictures of the same portion of the measurement object. In the present invention, processing is carried out to paste a texture picture on each of the patch surfaces combined with each other as described earlier by referring to FIG. 4. In the case of texture pictures taken at different points of view, it is thus desirable to make the same inter-patch concentration uniform. For this reason, inter-frame concentrations are first corrected.

Figure 5:
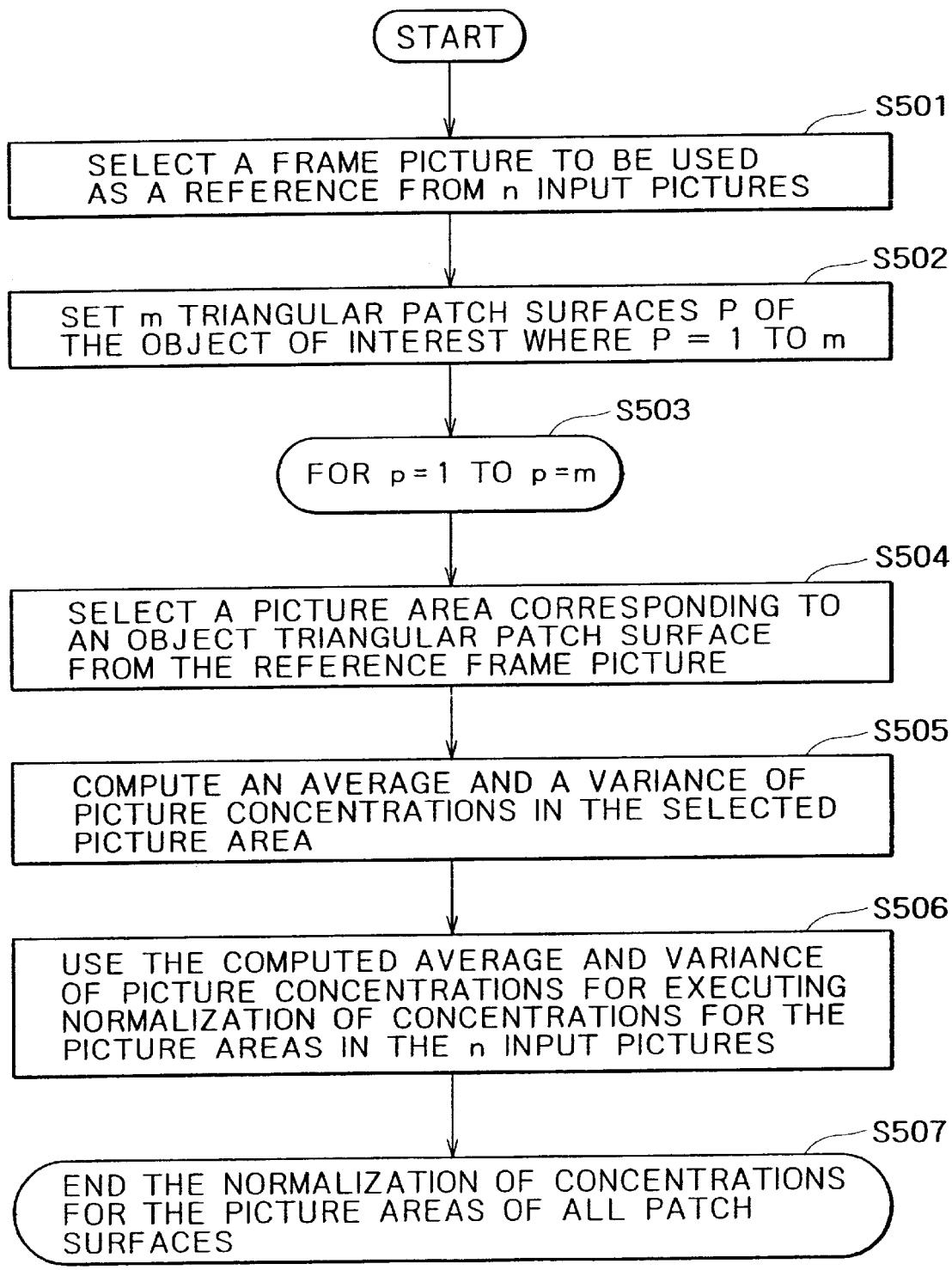
FIG. 5 shows a flowchart used for explaining the procedure of inter-frame picture-concentration-value correction processing carried out by the three-dimensional-picture-generating apparatus according to the present invention.
Figure 6:
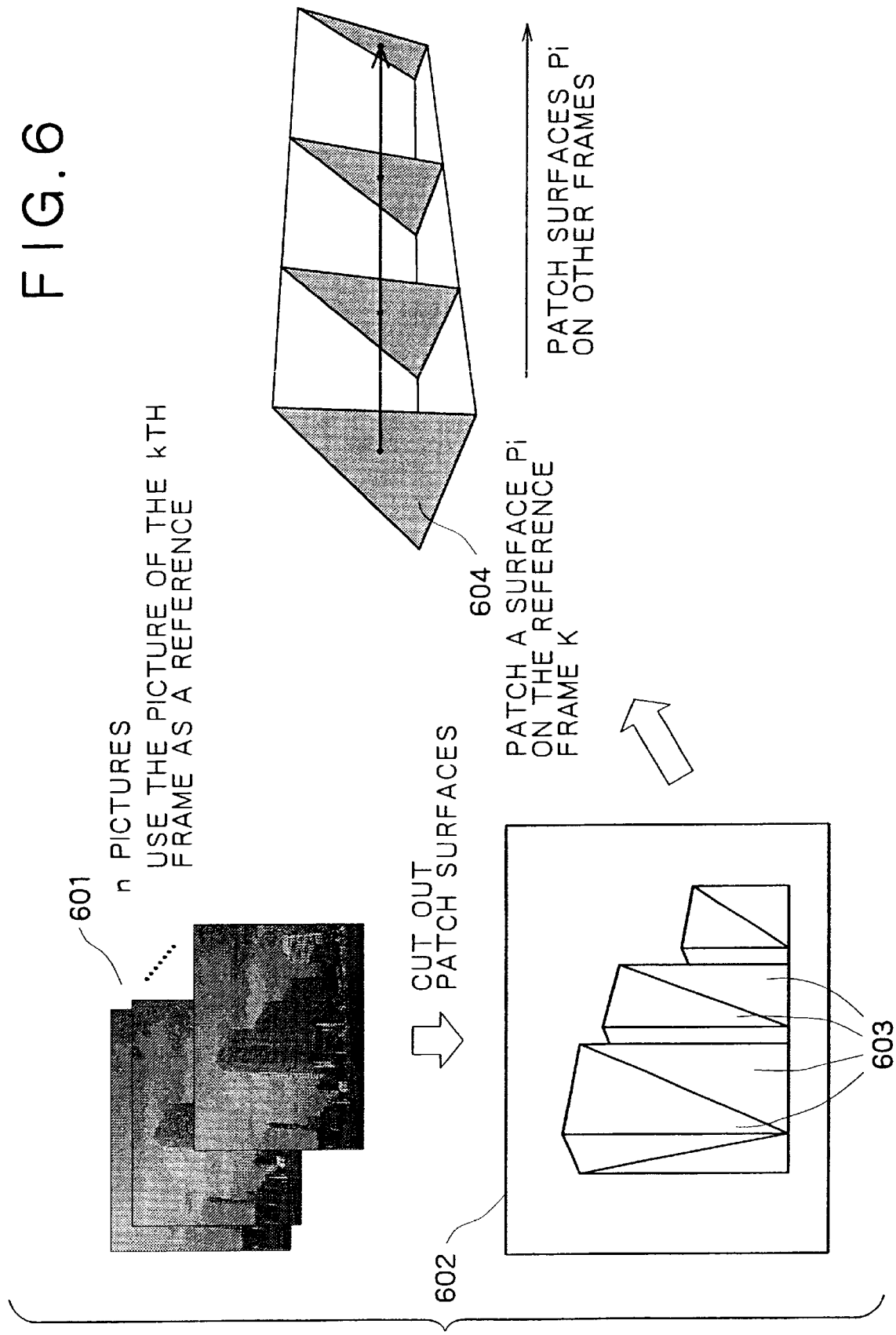
FIG. 6 is an explanatory diagram showing an outline of the inter-frame picture-concentration-value correction processing carried out by the three-dimensional-picture-generating apparatus according to the present invention.

FIG. 5 shows a flowchart used for illustrating the procedure of the inter-frame picture-concentration-value correction processing. FIG. 6 is an explanatory diagram showing an outline of the correction processing represented by the flowchart shown in FIG. 5. Pieces of processing represented by the flowchart shown in FIG. 5 are described sequentially one piece after another by referring to FIG. 6.

As shown in FIG. 5, the flowchart begins with a step S501 at which a reference frame is selected from n frame pictures taken from different points of view. In the processing example shown in FIG. 6, for instance, a texture picture of the Kth frame is selected as a reference picture from n frame pictures 601. The selected texture picture is used as a reference picture 602.

Then, at the next step S502, an object for generating a three-dimensional picture is selected from the reference picture and an object of interest on the reference picture is divided into triangular patch surfaces. Then, m triangular patch surfaces are determined. In the case of the processing shown in FIG. 6, as an object for generating a three-dimensional picture, three buildings are selected from the reference picture 602 as an object for generating a three-dimensional picture. On the object for generating a three-dimensional picture, a number of patch surfaces 603 is set.

Subsequently, at the next step S503, the m patch surfaces set at the step S502 are sequentially selected, starting with surface 1 and ending with surface m. Then, pieces of processing of steps S504 to S506 are carried out repeatedly. To be more specific, at the step S504, a triangular patch surface is selected from the reference picture of the Kth frame and its picture area is set. Subsequently, at the step S505, for the picture area set for the triangular patch surface selected from the reference picture of the Kth frame, an average value of picture concentrations and a variance of picture concentrations are computed with respect to the n texture pictures. Then, at the next step S506, the average value and the variance computed at the step S505 are used for carrying out processing to normalize concentrations of the picture area set for the n texture pictures. In the case of the processing shown in FIG. 6, n texture pictures represented by a picture area 604 set for a triangular patch surface selected from a reference picture of the Kth frame are extracted, and an average as well as a variance of the extracted picture concentrations are computed. Then, the computed average and the computed variance are used for carrying out processing to normalize picture concentrations of the picture area set 604 for the n texture pictures. The pieces of processing of steps S504 to S506 are carried out for a patch surface and repeated for all patch surfaces 1 to m. Finally, processing is carried out at the last step S507 to form a judgment as to whether or not the normalization processing has been carried out for all patch surfaces 1 to m. If the normalization has been carried out for all patch surfaces 1 to m, the whole processing is ended.

In the processing represented by the flowchart shown in FIG. 5, a picture area is set for each of m triangular patch surfaces selected from a reference picture and normalization processing is carried out for each of the m triangular patch surfaces. Normalization processing of concentrations among frame pictures can also be carried out without setting triangular patch surfaces. In this case, a predetermined area is selected from a frame picture, and an average as well as a variance of concentrations over the selected area are then computed. Finally, normalization processing is carried out on concentrations of corresponding pictures of other frames. This processing is represented by a flowchart shown in FIG. 7.

Figure 7:
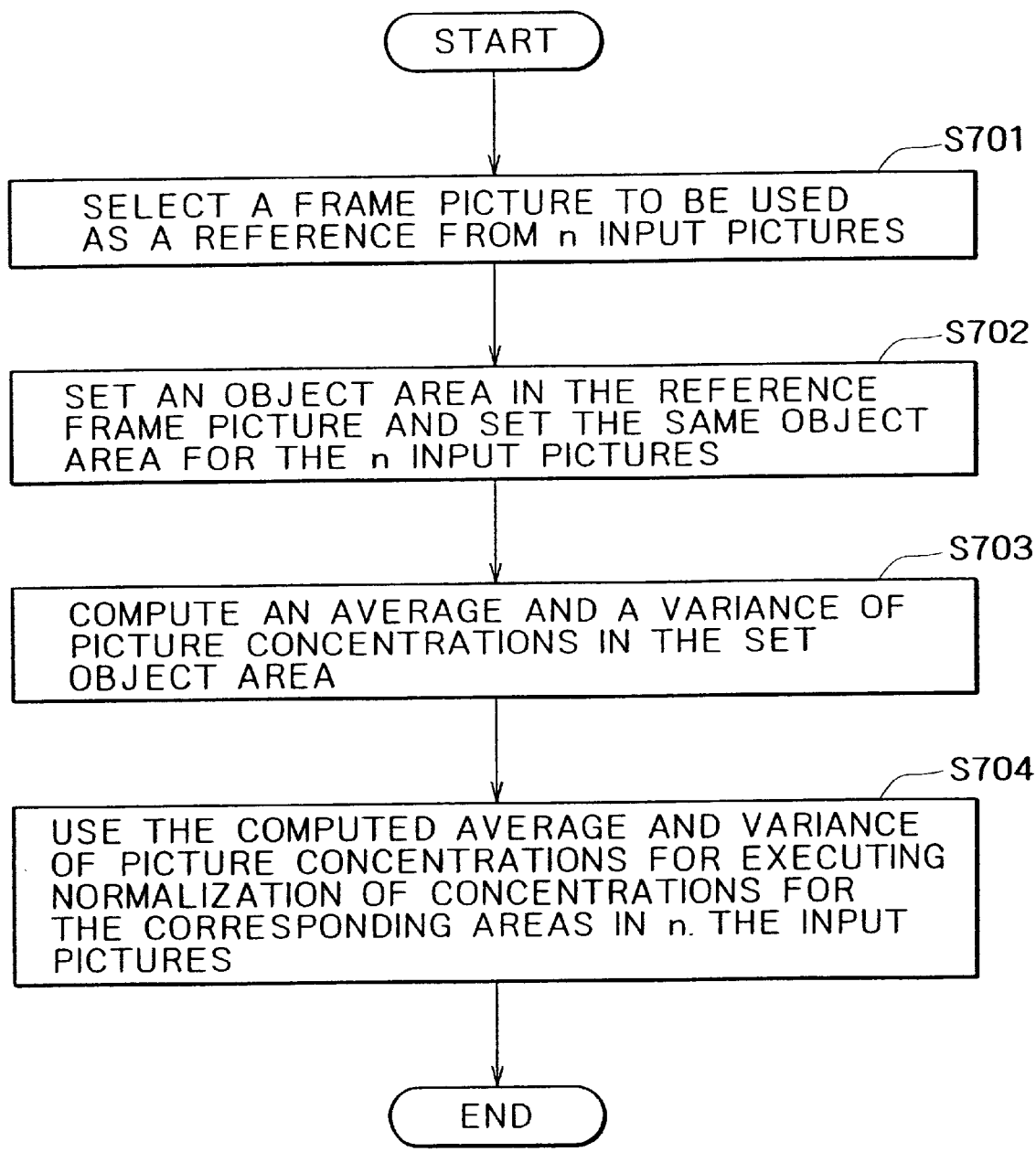
FIG. 7 shows a flowchart used for explaining the procedure of a second typical implementation of the inter-frame picture-concentration-value correction processing carried out by the three-dimensional-picture-generating apparatus provided by the present invention.

The flowchart shown in FIG. 7 begins with a step S701 at which a reference frame is selected from n frame pictures taken from different points of vision in the same way as the step S501 of the flowchart shown in FIG. 5. Subsequently, at the next step S702, an area is set in the reference picture frame, and an area of the same object is set in each other frame. In the processing shown in FIG. 6, an entire area showing three buildings can be selected from the reference frame picture 602 as an object area.

Then, at the next step S703, an average and a variance of picture concentrations in the object area are computed. Subsequently, at the next step S704, the average and the variance computed at the step S703 are used for carrying out processing to normalize concentrations for corresponding areas of n frames. By carrying out these pieces of processing, picture concentrations among frames are normalized.

b: Inter-Patch Texture-Picture-Shift Correction

Figure 8:
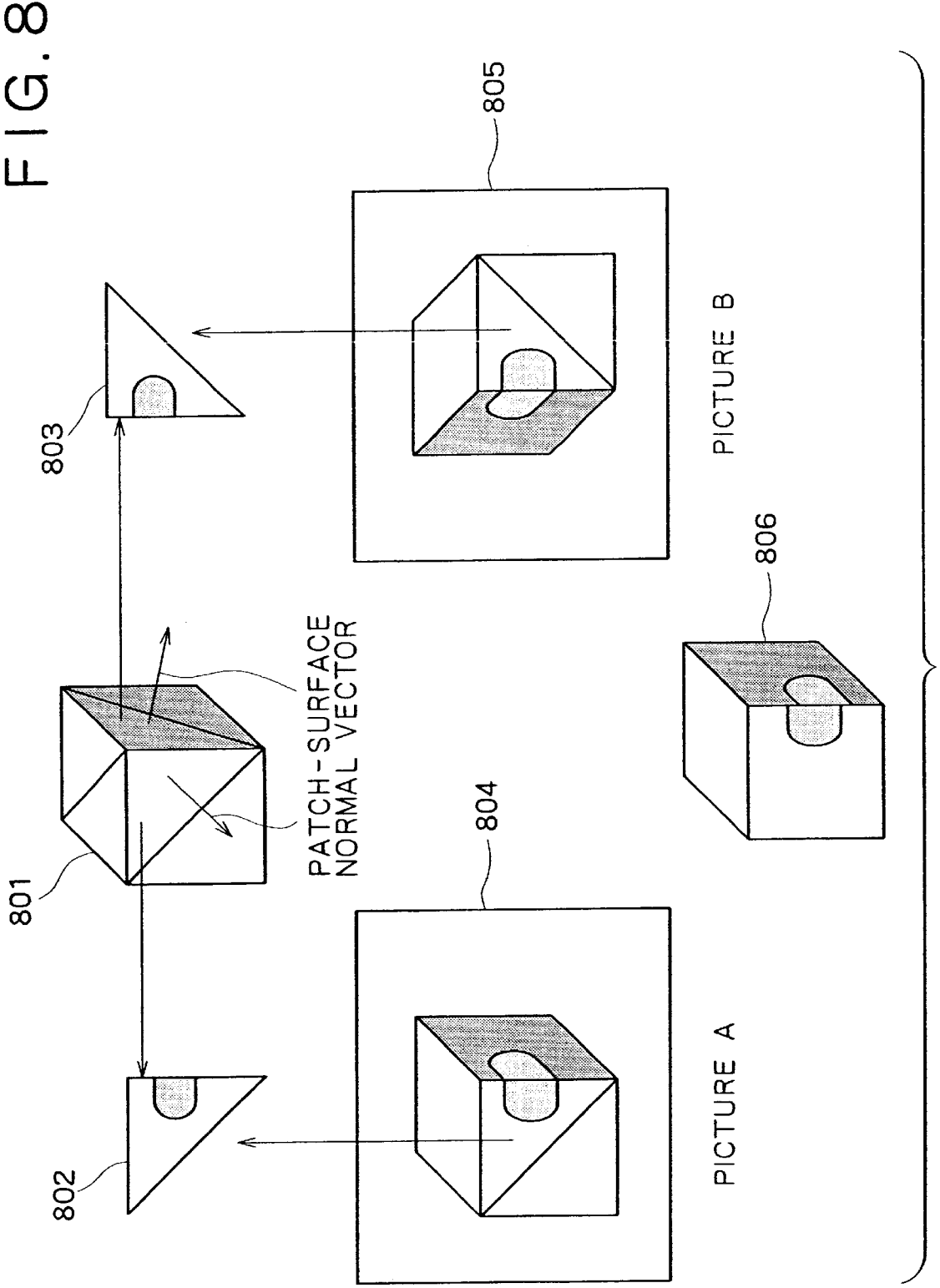
FIG. 8 is an explanatory diagram used for describing inter-patch texture-picture-shift correction carried out by the three-dimensional-picture-generating apparatus according to the present invention.

Next, inter-patch texture-picture-shift correction is described. FIG. 8 is an explanatory diagram used for describing the inter-patch texture-picture-shift correction. As described earlier, the texture-picture-pasting process of the present invention adopts a technique of pasting texture pictures taken from different points of view. Thus, on adjacent triangular patch surfaces, texture pictures taken from different points of view are combined in many cases. In such a case, there is raised a problem of a shift between patch surfaces as shown in FIG. 8.

FIG. 8 is a diagram showing a triangular patch configuration block 801 to be pasted on a restored three-dimensional shape as well as showing pasted texture pictures 802 and 803. The texture picture 802 is a picture selected from an A texture picture 804. The texture picture 802 is taken from a photographing visual point's direction forming a smallest angle with the normal vector of its patch surface. On the other hand, the texture picture 803 is a picture selected from a B texture picture 805. The texture picture 803 is taken from a photographing visual point's direction forming a smallest angle with the normal vector of its patch surface.

When area pictures corresponding to triangular patch surfaces are selected from the different pictures 804 and 805 as described above and pasted/combined, a shift results on the picture supposed to have matching surfaces as is obvious in a texture mapping picture 806 shown in FIG. 8. This shift is caused by positional shifts of points constituting the triangular patch surfaces. Such a positional shift is referred to as a characteristic point tracking shift. The following describes processing to correct such a picture shift or a texture shift on a boundary between triangular surfaces.

Figure 9:
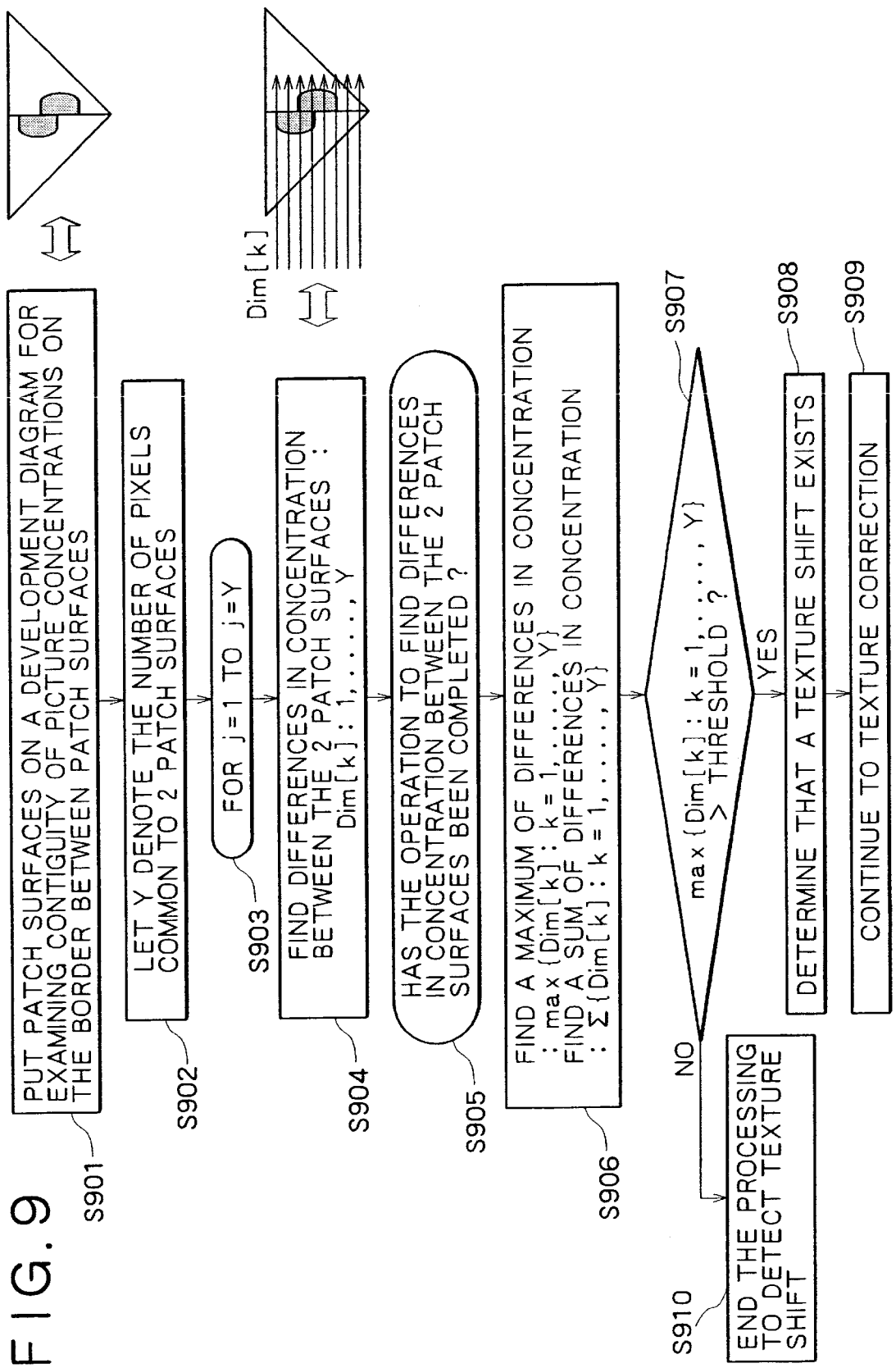
FIG. 9 shows a flowchart used for explaining a pre-step of the correction processing carried out by the three-dimensional-picture-generating apparatus according to the present invention to form a judgment as to whether or not a texture shift exists between pasted and combined triangular patch surfaces.

First of all, as a pre-step of the correction processing, it is necessary to form a judgment as to whether or not a texture shift exists between pasted and combined triangular patch surfaces. The pre-step of the correction processing to form a judgment as to whether or not a texture shift exists between pasted and combined triangular patch surfaces is represented by a flowchart shown in FIG. 9. Pieces of processing carried out at steps of the flowchart shown in FIG. 9 are described as follows.

The flowchart begins with a step S901 at which a patch-surface-developing diagram is created in order to examine contiguity of picture concentrations on the boundary between adjacent patch surfaces. The patch-surface-developing diagram is a diagram showing a plurality of developed patch surfaces pasted with texture pictures taken from different points of view. Then, at the next step S902, the number of pixels common to two adjacent patch surfaces is found. Let notation Y denote this number. Processing of a step S904 is carried out repeatedly for pixels j where j=1 to Y. The subscript j is incremented by 1 at a step S903 each time the step S904 is executed. At the step S904, a difference in concentration between coinciding pixels on the adjacent patch surfaces is found. The difference is denoted by notation Dim [k] where k=1 to Y.

Then, the flow of the processing goes on to a step S905 to form a judgment as to whether or not the processing carried out at the step S904 to find a difference in concentration between coinciding pixels on the adjacent patch surfaces has been completed for k=1 to Y. If the differences Dim [k] have been all found for k=1 to Y, the flow of the processing goes on to a step S906 at which max {Dim [k]: k=1 - - - Y} and Σ{Dim [k]: k=1 - - - Y} for concentrations of all pixels common to the adjacent patch surfaces are found. The notation max {Dim [k]: k=1 - - - Y} denotes a maximum value of differences in concentration between pixels common to the adjacent patch surfaces among all such pixels. On the other hand, the notation $\Sigma\{\text{Dim }[k]: k=1 --- Y\}$ denotes a sum of differences in concentration between pixels common to the adjacent patch surfaces for all such pixels.

Then, at the next step S907, the maximum value max $\{\text{Dim }[k]: k=1 --- Y\}$ of differences in concentration between pixels common to the adjacent patch surfaces among all such pixels is compared with a predetermined threshold value. A small threshold value results in a picture with higher precision. However, the smaller the threshold value, the more the correction processing that needs to be done between patch surfaces. Thus, it is desirable to set the threshold at a value according to the demanded precision of the resulting picture. If the maximum value max $\{\text{Dim }[k]: k=1 --- Y\}$ of differences in concentration between pixels common to the adjacent patch surfaces among all such pixels is found greater than the predetermined threshold value, the flow of the processing goes on to a step S908 at which a texture shift is judged to exist. At the next step S909, texture-picture correction is carried out. If the maximum value max $\{\text{Dim }[k]: k=1 --- Y\}$ of differences in concentration between pixels common to the adjacent patch surfaces among all such pixels is found equal to or smaller than the predetermined threshold value, on the other hand, the flow of the processing goes on to a step S910 at which no texture shift is judged to exist. The processing to detect a texture shift is completed.

Figure 10:
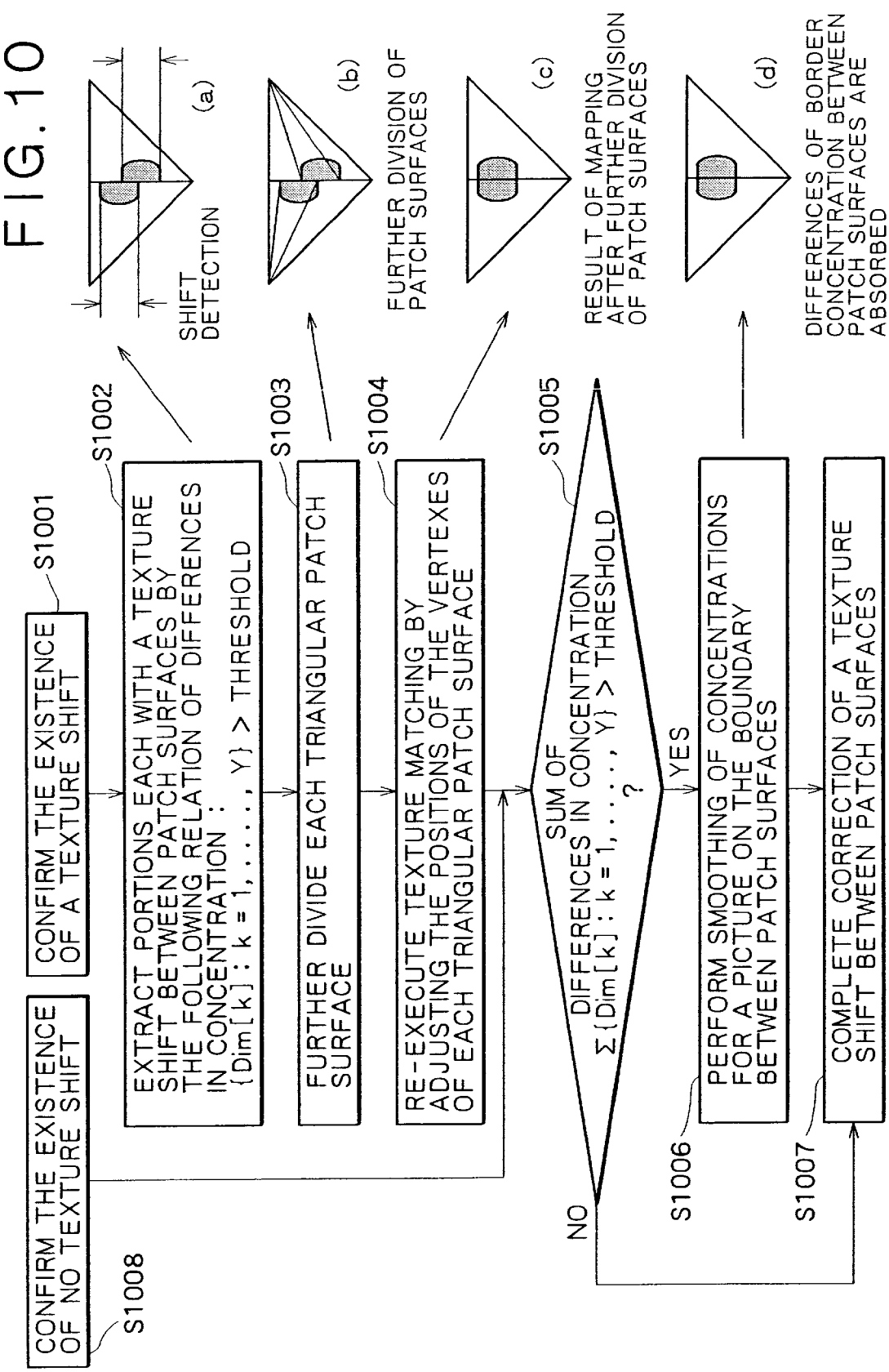
FIG. 10 shows a flowchart used for explaining a first typical implementation of processing carried out by the three-dimensional-picture-generating apparatus according to the present invention to correct a texture shift between adjacent patch surfaces.

The following describes processing to correct a texture shift between adjacent patch surfaces by referring to a flowchart shown in FIG. 10. The processing represented by the flowchart shown in FIG. 10 to correct a texture shift between adjacent patch surfaces is carried out as a continuation of the flowchart shown in FIG. 9. The processing begins with a step S1001 at which the existence of a texture shift is confirmed. The processing may also begin with a step S1008 at which the existence of no texture shift is confirmed. As the existence of a texture shift is confirmed, the flow of the processing goes on from the step S1001 to a step S1002 at which the location of the texture shift is determined by comparing the sum $\Sigma\{\text{Dim }[k]: k=1 --- Y\}$ of differences in concentration between pixels common to the adjacent patch surfaces among all such pixels with a threshold value. The texture shift on the boundary between adjacent patch surfaces is detected by the processing as shown in FIG. 10A. Subsequently, at the next step S1003, processing is carried out to further divide each of the triangular patch surfaces detected at the step S1002 into smaller triangular patch surfaces. Each of the triangular patch surfaces is divided into smaller triangular patch surfaces in order to separate a portion including the detected shift from other portions as shown 10B.

Then, at the next step S1004, texture mapping is again carried out by adjusting the positions of vertexes of smaller triangular patch surfaces. The positions of vertexes of smaller triangular patch surfaces are adjusted in order to eliminate the detected shift. A result with the shift eliminated is shown in FIG. 10C.

The flow of the processing then goes on to a step S1005 at which the sum $\Sigma\{\text{Dim }[k]: k=1 --- Y\}$ of differences in concentration between pixels common to the adjacent patch surfaces among all such pixels is also compared with the threshold value. As is obvious from the flowchart shown in FIG. 10, the sum $\Sigma\{\text{Dim }[k]: k=1 --- Y\}$ of differences in concentration between pixels common to the adjacent patch surfaces among all such pixels is also compared with the threshold value at the step S1005 even if the existence of no texture shift is confirmed at the step S1008. As described earlier, the sum $\Sigma\{\text{Dim }[k]: k=1 --- Y\}$ of differences in concentration between pixels common to the adjacent patch surfaces among all such pixels is found in the shift judgment processing represented by the flowchart shown in FIG. 9. The sum $\Sigma\{\text{Dim }[k]: k=1 --- Y\}$ of differences in concentration between pixels common to the adjacent patch surfaces among all such pixels is also compared with the threshold value to form a judgment as to whether or not a difference in concentrations as a whole exists between the adjacent patch surfaces. If the result of the comparison carried out at the step S1005 indicates that the sum $\Sigma\{\text{Dim }[k]: k=1 --- Y\}$ of differences in concentration between pixels common to the adjacent patch surfaces among all such pixels is greater than the threshold value, the flow of the processing goes on to a step S1006 at which a concentration-smoothing process is carried out on pixels on the boundary between the patch surfaces. The concentration-smoothing process will be described later. If the result of the comparison carried out at the step S1005 indicates that the sum $\Sigma\{\text{Dim }[k]: k=1 --- Y\}$ of differences in concentration between pixels common to the adjacent patch surfaces among all such pixels is equal to or smaller than the threshold value, on the other hand, the flow of the processing goes on to a step S1007 at which the texture correction processing is ended.

Figure 11:
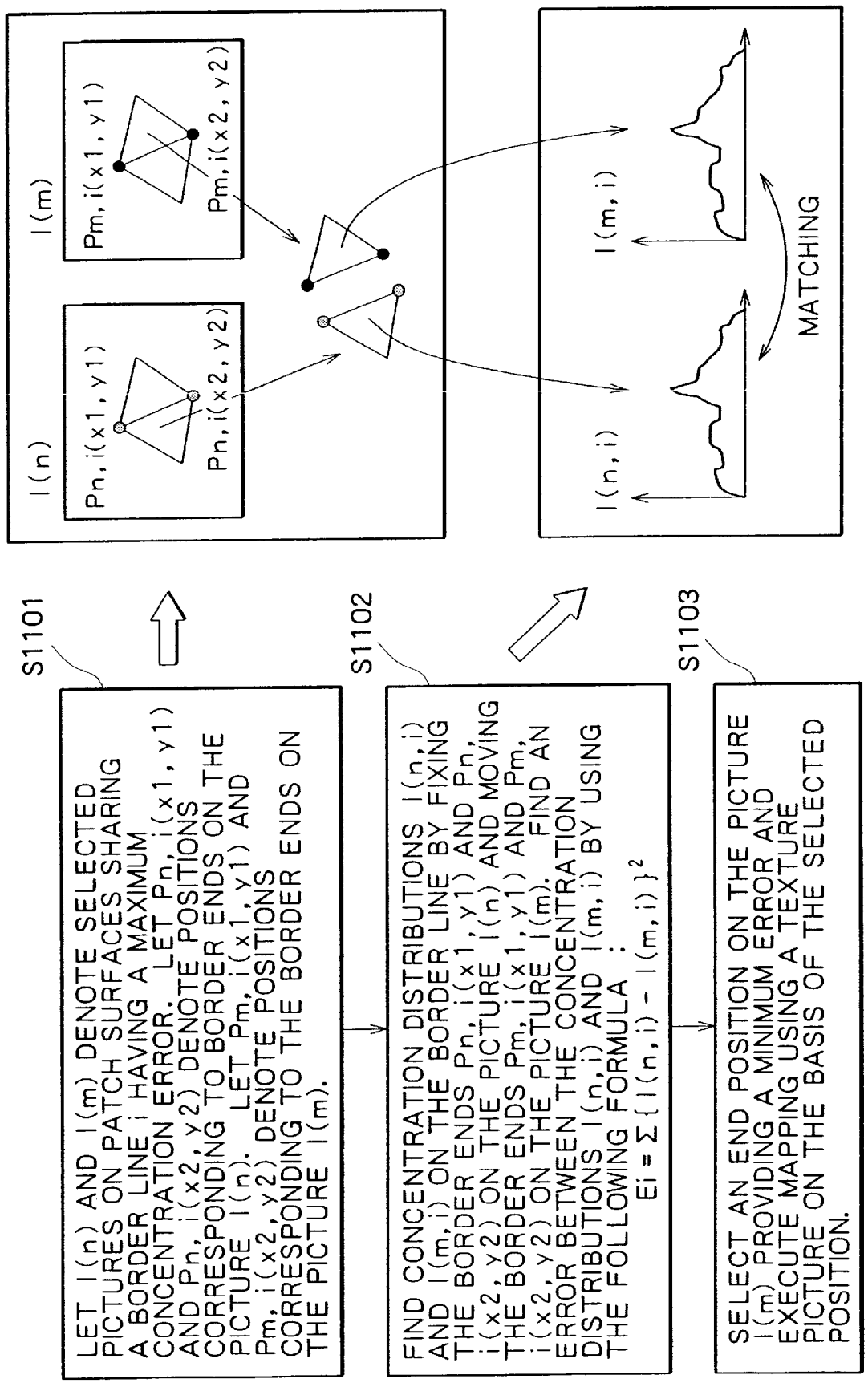
FIG. 11 shows a flowchart used for explaining a second typical implementation of processing carried out by the three-dimensional-picture-generating apparatus according to the present invention to correct a texture shift between adjacent patch surfaces.
Figure 12:
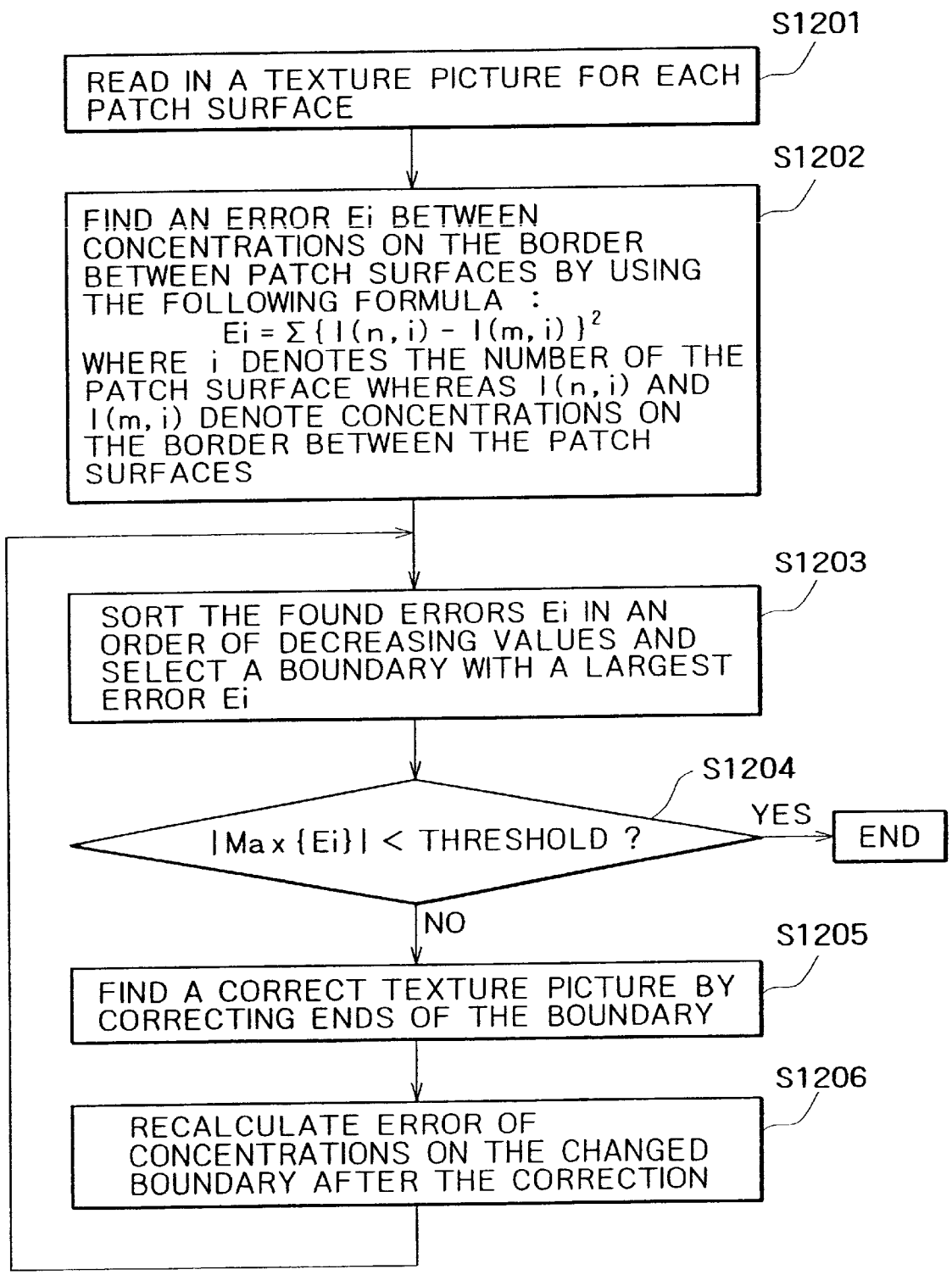
FIG. 12 shows a flowchart used for explaining processing carried out by the three-dimensional-picture-generating apparatus according to the present invention to correct a texture shift between adjacent patch surfaces on the entire three-dimensional picture.

In the processing to correct a texture-picture shift between patch surfaces, it is possible to adopt a method represented by the processing flowchart shown in FIG. 10. As an alternative, pieces of processing represented by flowcharts shown in FIGS. 11 and 12 can also be applied as the processing to correct a texture-picture shift between patch surfaces. Next, the pieces of processing represented by flowcharts shown in FIGS. 11 and 12 are described. FIG. 11 shows a flowchart representing processing to correct a texture-picture shift between patch surfaces adjacent to each other. On the other hand, FIG. 12 shows a flowchart representing a process to sequentially carry out the processing represented by the flowchart shown in FIG. 11 on a number of patch surfaces on the whole three-dimensional picture. First of all, the processing represented by the flowchart shown in FIG. 11 is described.

As shown in FIG. 11, the flowchart begins with a step S1101 to detect a boundary line i providing a maximum error between concentrations on a number of adjacent patch surfaces for pictures pasted on the patch surfaces. Refer to a diagram on the right upper portion in FIG. 11. Notations I (n) and I (m) shown in the figure denote texture pictures pasted on adjacent patch surfaces sharing the boundary line i. Notations Pn, i (x1, y1) and Pn, i (x2, y2) denote positions corresponding to border ends on the texture picture I (n). By the same token, notations Pm, i (x1, y1) and Pm, i (x2, y2) denote positions corresponding to the border ends on the texture picture I (m).

The flow of the processing then goes on to a step S1102 to find concentration distributions I (n, i) and I (m, i) on the border line between the texture pictures I (n) and I (m) pasted on the patch surfaces by fixing typically the border ends Pn, i (x1, y1) and Pn, i (x2, y2) on the picture I (n) and moving typically the border ends Pm, i (x1, y1) and Pm, i (x2, y2) on the picture I (m). Then, an error between the concentration distributions I (n, i) and I (m, i) is found by using the following formula (2) and saved.

$$Ei = \Sigma\{I(n, i) - I(m, i)\}^2 \qquad (2)$$

The flow of the processing then goes on to a step S1103 to select an end position on the picture I (m) providing a minimum error and executes mapping using a texture picture on the basis of the selected position. The selection process carried out at the step S1103 is shown in a diagram on the right lower portion of FIG. 11. As shown in the diagram, the concentration distributions I (n, i) and I (m, i) on the border line between the texture pictures I (n) and I (m) are compared with each other to find the border ends Pm, i (x1, y1) and Pm, i (x2, y2) on the picture I (m) providing a smallest error between the concentration distributions. By carrying out such a process, a positional shift between adjacent patch surfaces can be corrected.

FIG. 12 shows a flowchart representing a process to sequentially carry out the processing represented by the flowchart shown in FIG. 11 on the whole of a plurality of patch surfaces.

The flowchart shown in FIG. 12 begins with a step S1201 to read in a texture picture for each patch surface. As described above, a picture taken from a photographing point of view closest to the direction of the normal vector of a patch surface is selected as the texture picture for the patch surface.

The flow of the processing then goes on to a step S1202 to find an error Ei between concentrations on the border between patch surfaces by using Eq. (2). The flow of the processing then goes on to a step S1203 to sort the found errors Ei in an order of decreasing values and select a boundary line with a largest error Ei. The flow of the processing then goes on to a step S1204 to compare |Max {Ei}| with a predetermined threshold value where notation |Max {Ei}| denotes the absolute value of the largest error Ei.

If |Max {Ei}| is found smaller than the predetermined threshold value, the correction processing is ended since correction is not required. If |Max {Ei}| is found equal to or greater than the predetermined threshold value, on the other hand, the flow of the processing goes on to a step S1205 to find a correct texture picture by correcting ends of the boundary line in the processing shown in FIG. 11. Then, the flow of the processing goes on to a step S1206 to recalculate the error of concentrations on the changed boundary between the patch surfaces after the correction by using Eq. (2). The flow of the processing then goes back to the step S1203 to repeat the step S1202 and the subsequent steps. As the result of the comparison at the step S1204 indicates that |Max {Ei}| is smaller than the predetermined threshold value, the correction processing is ended. By carrying out the correction processing described above, a patch shift of a three-dimensional picture can be eliminated.

c: Inter-Patch Boundary Concentration Smoothing Correction

The following describes correction processing to smooth concentrations on a boundary line between patch surfaces. Pictures pasted on patch surfaces are taken from different points of view. Thus, since their radiation conditions differ from each other, concentrations including RGB values may vary from picture to picture even in the case of pictures taken from the same member. The whole concentration correction is executed to a certain degree in the inter-frame picture-concentration-value correction described earlier in Section (a). Then, after texture pictures to be actually pasted are determined and the pasting process is completed, the inter-patch texture-picture-shift correction described in Section (b) is carried out. When the resulting picture is observed at a point of time the inter-patch texture-picture-shift correction described in Section (b) is completed, errors between concentrations on a boundary line between patch surfaces are striking in some cases. In this case, inter-patch boundary concentration smoothing correction is carried out to eliminate these errors. The following describes the inter-patch boundary concentration smoothing correction by referring to a flowchart shown in FIG. 13.

Figure 13:
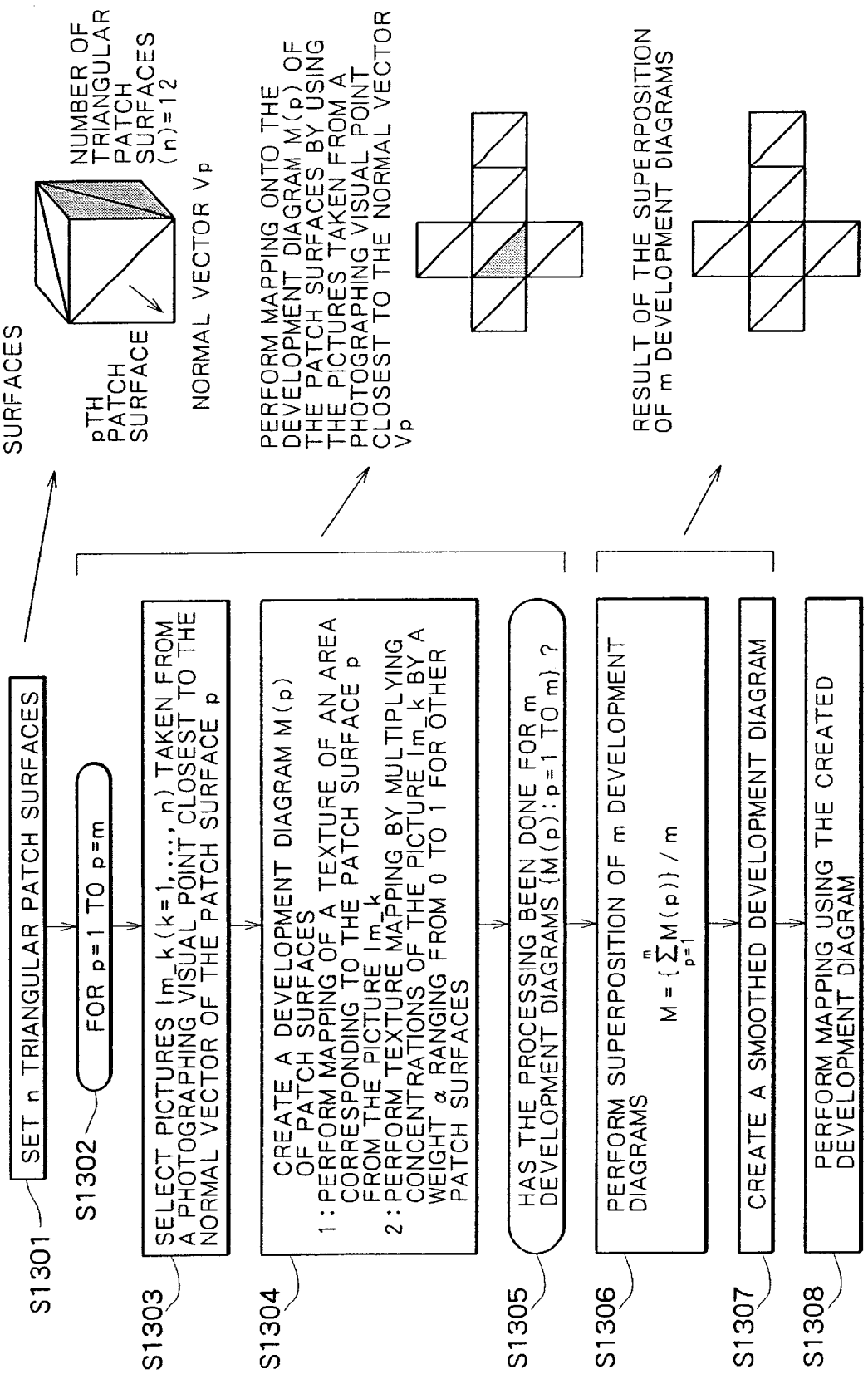
FIG. 13 shows a flowchart used for explaining inter-patch boundary concentration smoothing correction carried out by the three-dimensional-picture-generating apparatus according to the present invention.

FIG. 13 shows a flowchart representing the inter-patch boundary concentration smoothing correction. As shown in the figure, the flowchart begins with a step S1301 to find the number of triangular patch surfaces of a three-dimensional model to be pasted with texture pictures taken from a number of different visual points. Assume that the number of triangular patch surfaces is n. Then, pieces of processing of steps S1302 to S1305 are carried out on each of the n triangular patch surfaces.

At the next step S1302, the number p assigned to a patch surface is incremented by 1 (for p=1 to p=m). Then, the flow of the processing goes on to the next step S1303 to select one of pictures lm_k (k=1, - - - , n) which has been taken from a photographing visual point closest to the normal vector of the patch surface p. The flow of the processing then goes on to a step S1304 to create a development diagram M (p) of patch surfaces as shown in the middle diagram on the right side of FIG. 13 and to perform mapping of a texture of the selected picture lm_k onto an area of the patch surface p (=x). Then, texture mapping is further carried out by multiplying concentrations of the picture lm_k by a weight $\alpha$ ranging from 0 to 1 for each of other patch surfaces. A value of the weight $\alpha$ is selected from the range 0 to 1 as follows. For a small angle formed by the direction toward the photographing point of view and the normal vector of the patch area, a value of the weight $\alpha$ close to 1 is taken. For a large angle formed by the direction toward the photographing point of view and the normal vector of the patch area, on the other hand, a value of the weight $\alpha$ close to 0 is taken. By carrying out these pieces of processing for all the n patch surfaces, m development diagrams for m texture pictures used as pictures to be pasted on the patch surfaces are obtained at the step S1305 where m≦n.

Then, the flow of the processing goes on to a step S1306 to perform superposition of the m development diagrams on each other in accordance with Eq. (3) given as follows:

$$M = \frac{1}{m}\sum_{p=1}^{m} M(p) \quad (3)$$

Then, the flow of the processing goes on to a step S1307 to create a smoothed development diagram by carrying out a smoothing process, that is, smoothing by weighting concentrations of the m texture-picture development diagrams. Then, the flow of the processing goes on to a step S1308 to carry out mapping using texture pictures having concentrations set by the smoothing process.

Figure 14:
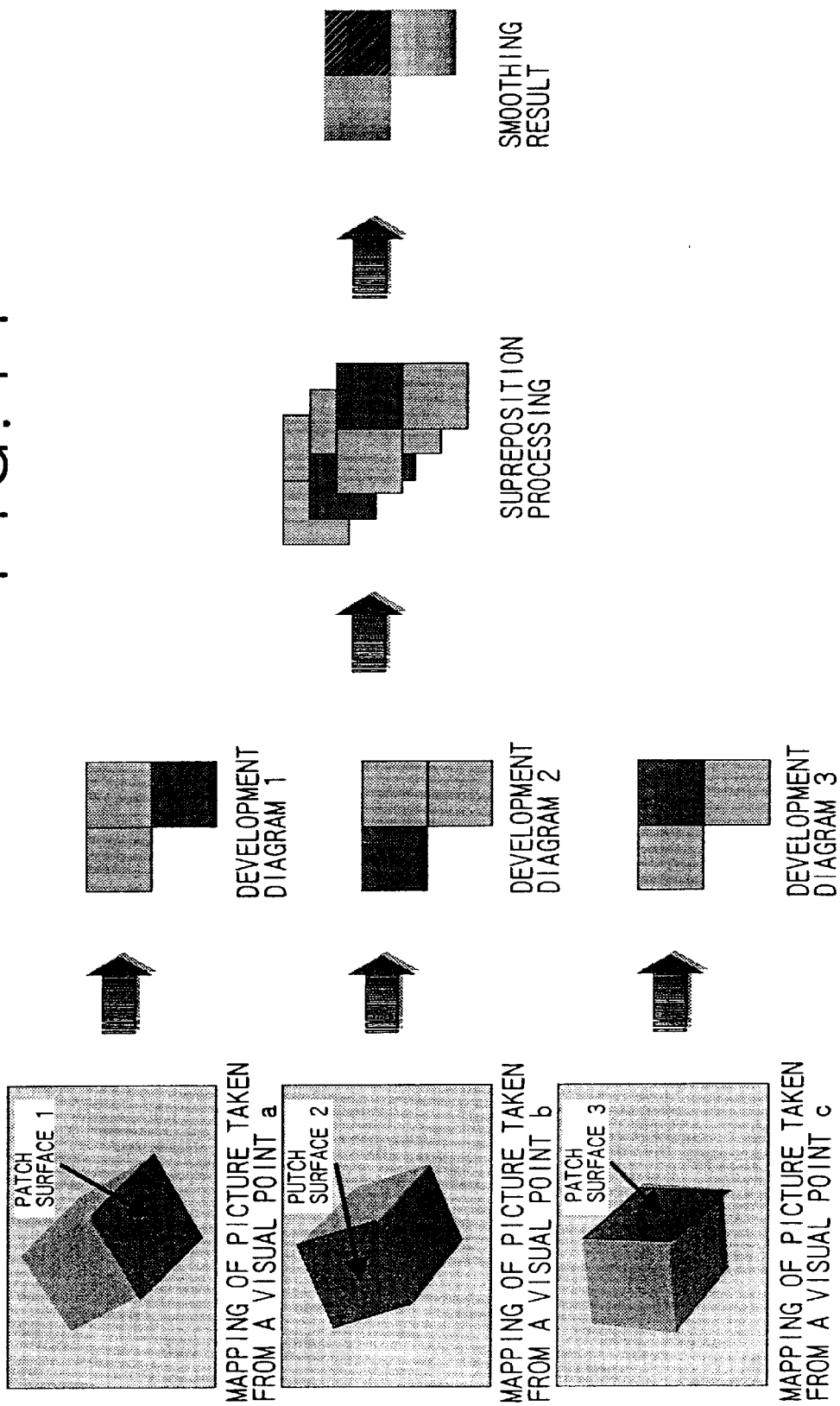
FIG. 14 is a descriptive diagram used for explaining the inter-patch boundary concentration smoothing correction carried out by the three-dimensional-picture-generating apparatus according to the present invention.

FIG. 14 is an explanatory diagram showing a typical smoothing process. As shown in diagrams on the left side of the figure, photographed pictures taken from directions closest to normal vectors of the respective 3 patch surfaces are selected to give three development diagrams. The development diagrams are each subjected to a weighting process described above and pasted with a texture picture. Then, the three texture mapping pictures are superposed on each other on the basis of Eq. (3) given above to result in a development diagram completing the smoothing process.

FIG. 15 is a flowchart representing a complete texture-mapping process carried out by pasting a texture picture taken from a direction closest to the normal vector of a patch surface on each patch surface by performing the inter-frame picture-concentration-value correction described earlier in Section (a), the inter-patch texture-picture-shift correction described in Section (b) and the inter-patch boundary concentration smoothing correction described in Section (c).

As shown in the figure, the flowchart begins with a step S1501 to set the total number of frames (j) taken as pictures of a three-dimensional display object from different angles at cnt_f and the total number of patch surfaces Pi of the three-dimensional display object at cnf_s. Then, at the next step S1502, the number (i) of the patch surface Pi is incremented sequentially: i++. The flow of the processing then goes on to a step S1503 to compute the normal vector ni of the patch surface Pi for the patch surface Pi. Subsequently, at the next step S1504, the number O) of the frame is incremented sequentially: j++. The flow of the processing then goes on to a step S1505 to compare the normal vector ni of the patch surface Pi with camera posture vectors Vj. The flow of the processing then goes on to a step S1506 to select a photographed image-i for a camera posture vector Vj closest to the normal vector ni of the patch surface Pi.

The pieces of processing of the steps 1504 to 1507 are carried out for all frames, one frame after another, by sequentially incrementing the frame number (j) to select a photographed image-i for a camera posture vector Vj closest to the normal vector ni of the patch surface Pi. The flow of the processing then goes on to a step S1508 to bind of the selected image-i to the patch surface Pi, that is, to paste the image-i on the patch surface Pi. The pieces of processing of the steps 1502 to 1509 are carried out for all patch surfaces Pi, one surface after another, by sequentially incrementing the patch-surface number (i) to paste an image on each of the patch surfaces Pi. The flow of the processing then goes on to a step S1510 to perform the inter-frame picture-concentration-value correction described earlier in Section (a), the inter-patch texture-picture-shift correction described in Section (b) and the inter-patch boundary concentration smoothing correction described in Section (c). The flow of the processing then goes on to a step S1511 to display a picture obtained as a result of the correction processing.

As described above, a picture having a highest resolution is selected for each patch surface to eventually create a texture picture. In addition, in order to correct differences in concentration between patch surfaces and concentration discontinuity along the border between patch surfaces, correction processing based on concentration normalization and reference picture concentration interpolation as well as a smoothing process using development diagrams of patch surfaces are carried out to produce a visually good three-dimensional display.

Figure 16A:
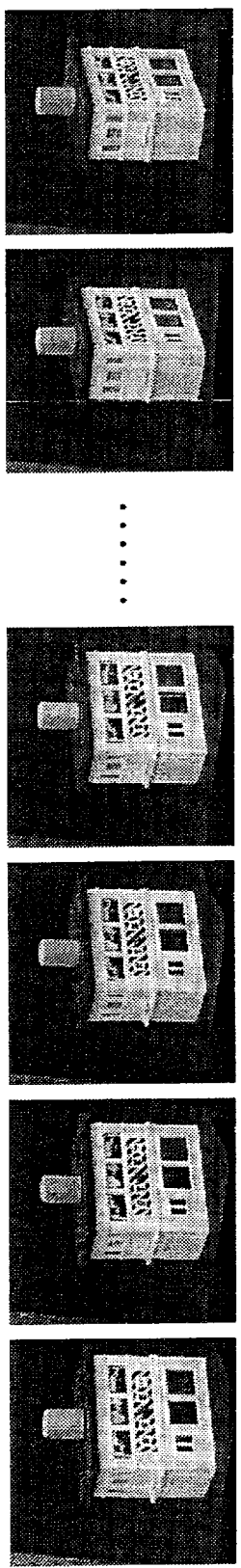
FIG. 16 is a diagram showing a proposed texture-mapping process carried out by selecting a picture for each patch surface in the three-dimensional-picture-generating apparatus according to the present invention.
Figure 16B:
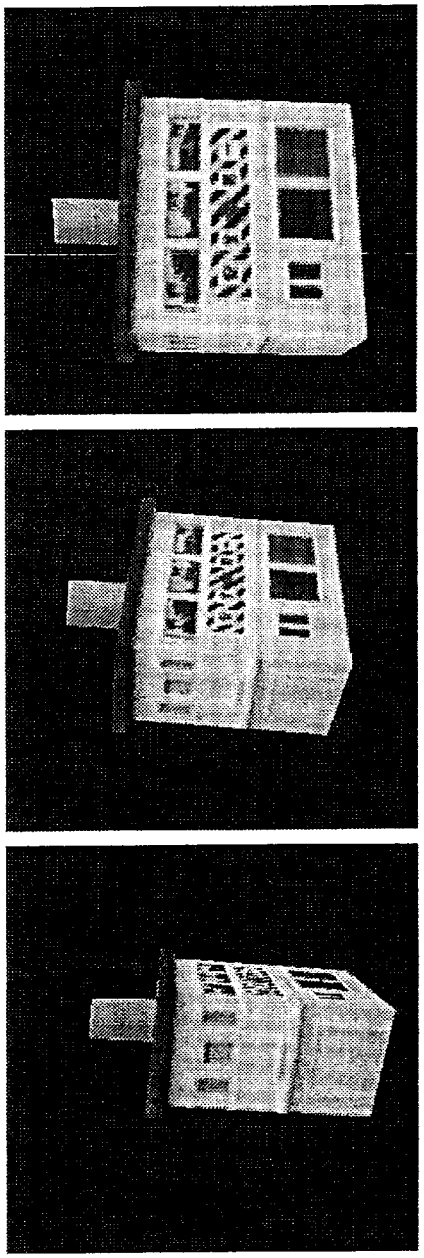

FIG. 16 is a diagram showing an embodiment implementing a proposed texture-mapping process. In an experiment, 16 pictures taken at different points of view as shown in FIG. 16A were used. For each patch surface, a picture with a highest resolution is selected by adoption of the technique described above whereby angles formed by the normal vector of the patch surface and the direction of the visual point of the camera are compared with each other. Finally, a texture-mapping process is carried out by using a picture completing processing to correct concentrations and a smoothing process. FIG. 16B is a diagram showing three-dimensional displays seen from three points of view. A texture picture with a high quality was verified to have been mapped for the three points of view.

FIG. 17 is a diagram showing results of comparison of the a proposed texture mapping technique with the techniques adopted so far. To be more specific, FIG. 17A is a diagram showing a display seen from a certain virtual point of view as a result of mapping a picture, namely, Frame 1 shown in FIG. 16A, onto a three-dimensional-shaped model. Since the texture does not vary even if the point of view is changed, unnaturalness of the texture exists. In particular, deterioration of the texture picture quality at the windows portion is striking. FIG. 17B is a diagram showing a display seen from a certain virtual point of view as a result of a mapping process by adoption of a technique whereby a picture taken from a photographing point of view closest to a virtual point of view is selected among the 16 pictures shown in FIG. 16A. When the point of view is changed, the texture varies discontinuously. As a result, discontinuity of concentrations between pictures caused by differences in photographing illumination is striking. In particular, deterioration of the texture picture quality at the windows portion is striking.

The result of the comparison indicates that the technique provided by the present invention allows a texture mapping process of a high picture quality to be carried out. To put it in detail, FIG. 17C is a diagram showing a display seen from a certain virtual point of view as a result of a mapping process by adoption of this mapping technique whereby a picture with a highest resolution is used for each patch surface. In this case, even when the point of view is changed, discontinuity of the texture picture is not striking and the windows portion can be expressed at a high picture quality. In addition, even for VRML expression of the texture mapping, the picture can be displayed at a high speed.

As described above, the present invention has been exemplified in detail by using preferred embodiments. It is obvious, however, that a person skilled in the art is capable of making changes to the embodiments and creating substitutes for the embodiments within a range not deviating from essentials of the present invention. In addition, the preferred embodiments used for exemplifying the present invention are not to be interpreted as restrictions. That is to say, the scope of the present invention is defined only by the scope of claims appended to this specification.

We claim as our invention:

1. A three-dimensional-picture-generating apparatus for generating a three-dimensional picture by pasting texture pictures on a three-dimensionally-shaped model, comprising:

means for selecting a picture with a highest resolution among a plurality of pictures obtained as a result of photographing an object of measurement from different camera points of view for each of a plurality of patch surfaces composing a three-dimensional picture;

means for carrying out texture mapping by applying said selected pictures to said respective patch surfaces as texture pictures;

means for computing a difference in concentration between adjacent patch surfaces on a border between said patch surfaces; and means for changing coordinates of end points of either of said patch surfaces to coordinates that minimize a total evaluation value of said differences which is computed.

2. A three-dimensional-picture-generating apparatus according to claim 1, wherein said means for selecting a picture with a highest resolution among a plurality of pictures for any particular one of said patch surfaces compares a normal vector of said particular patch surface with each of a plurality of photographing visual-point direction vectors; and selects a picture taken from a photographing visual-point direction forming a smallest angle with said normal vector of said particular patch surface for said particular patch surface.

3. A three-dimensional-picture-generating apparatus according to claim 1, further comprising means for carrying out processing to correct concentrations of a plurality of pictures taken from different camera photographing points of view, wherein said processing to correct concentrations is configured to compute an average and a variance of concentrations for each patch-surface unit or each set area unit of said pictures taken from different camera photographing points of view; and perform normalization.

4. A three-dimensional-picture-generating apparatus according to claim 1, further comprising means for carrying out processing to correct a texture-picture shift between patch surfaces, wherein said processing to correct a texture-picture shift is configured to compute said difference in concentration between adjacent patch surfaces on said border between said patch surfaces; detect said texture-picture shift; further divide each of said patch surfaces on the basis of said detected texture-picture shift; and perform re-mapping.

5. A three-dimensional-picture-generating apparatus according to claim 1, further comprising:

means for detecting a portion of a texture-picture shift between said patch surfaces on the basis of said difference which is computed; and means for dividing each of said patch surfaces including said portion of said detected texture-picture shift;

wherein said computing is configured to compute a difference in concentration between adjacent said divided patch surfaces on a border between said divided patch surfaces, and said changing coordinates is configured to change coordinates of end points of either of said divided patch surfaces to coordinates that minimize a total evaluation value of said differences which is computed.

6. A three-dimensional-picture-generating apparatus according to claim 1, further comprising means for carrying out processing to correct a texture-picture shift between patch surfaces, wherein said processing to correct a texture-picture shift is configured to compute an error in concentration between each two adjacent patch surfaces on said border between said patch surfaces for a plurality of patch surfaces composing a three-dimensional picture; perform processing to correct a shift under a condition that an error is greater than a threshold value determined in advance for a largest value among a plurality of computed errors in concentrations; and complete said processing to correct a shift under a condition that errors in concentration which are computed between each two adjacent patch surfaces on said border between said patch surfaces for a plurality of patch surfaces composing a three-dimensional picture all do not exceed said threshold value.

7. A three-dimensional-picture-generating apparatus according to claim 1, further comprising means for carrying out processing to smooth concentrations on a border between patch surfaces, wherein said processing to smooth concentrations is configured to compare a normal vector of said particular patch surface with each of a plurality of photographing visual-point direction vectors; select a picture taken from a photographing visual-point direction forming a smallest angle with said normal vector of said particular patch surface for said particular patch surface; paste said selected picture on said particular patch surface; create as many texture development diagrams each comprising a texture picture pasted on a plurality of patch surfaces by superposition as a plurality of texture pictures pasted on patch surfaces; superpose said texture development diagrams on each other; and smooth concentrations of each of said patch surfaces.

8. A three-dimensional-picture-generating method for generating a three-dimensional picture by pasting texture pictures on a three-dimensionally-shaped model, said method comprising the steps of:

selecting a picture with a highest resolution among a plurality of pictures obtained as a result of photographing an object of measurement from different camera points of view for each of a plurality of patch surfaces composing a three-dimensional picture;

carrying out texture mapping by applying said selected pictures to said respective patch surfaces as texture pictures;

computing a difference in concentration between adjacent patch surfaces on a border between said patch surfaces; and changing coordinates of end points of either of said patch surfaces to coordinates that minimize a total evaluation value of said differences which is computed.

9. A three-dimensional-picture-generating method according to claim 8, wherein said step of selecting a picture with a highest resolution for any particular one of said patch surfaces includes the steps of:

comparing a normal vector of said particular patch surface with each of a plurality of photographing visual-point direction vectors; and selecting a picture taken from a photographing visual-point direction forming a smallest angle with said normal vector of said particular patch surface for said particular patch surface.

10. A three-dimensional-picture-generating method according to claim 8, further comprising the step of carrying out processing to correct concentrations of a plurality of pictures taken from different camera photographing points of view;

wherein said processing to correct concentrations is carried out by computing an average and a variance of concentrations for each patch-surface unit or each set area unit of said pictures taken from different camera photographing points of view; and performing normalization.

11. A three-dimensional-picture-generating method according to claim 8, further comprising the step of carrying out processing to correct a texture-picture shift between patch surfaces, wherein said processing to correct a texture-picture shift is carried out by computing said difference in concentration between adjacent patch surfaces on said border between said patch surfaces; detecting said texture-picture shift; further dividing each of said patch surfaces on the basis of said detected texture-picture shift; and performing re-mapping.

12. A three-dimensional-picture-generating method according to claim 8, further comprising the steps of:

detecting a portion of a texture-picture shift between said patch surfaces on the basis of said difference which is computed; and dividing each of said patch surfaces including said portion of said detected texture-picture shif;

wherein said computing is configured to compute a difference in concentration between adjacent said divided patch surfaces on a border between said divided patch surfaces, and said changing coordinates is configured to change coordinates of end points of either of said divided patch surfaces to coordinates that minimize a total evaluation value of said differences which is computed.

13. A three-dimensional-picture-generating method according to claim 8, further comprising the step of carrying out processing to correct a texture-picture shift between patch surfaces, wherein said processing to correct a texture-picture shift is carried out by computing an error in concentration between each two adjacent patch surfaces on said border between said patch surfaces for a plurality of patch surfaces composing a three-dimensional picture; performing processing to correct a shift under a condition that an error is greater than a threshold value determined in advance for a largest value among a plurality of computed errors in concentrations; and completing said processing to correct a shift under a condition that errors in concentration which are computed between each two adjacent patch surfaces on said border between said patch surfaces for a plurality of patch surfaces composing a three-dimensional picture all do not exceed said threshold value.

14. A three-dimensional-picture-generating method according to claim 8, further comprising the step of carrying out processing to smooth concentrations on a border between patch surfaces, wherein said processing to smooth concentrations is carried out by comparing a normal vector of said particular patch surface with each of a plurality of photographing visual-point direction vectors; selecting a picture taken from a photographing visual-point direction forming a smallest angle with said normal vector of said particular patch surface; pasting said selected picture on said particular patch surface; creating as many texture development diagrams each comprising a texture picture pasted on a plurality of patch surfaces by superposition as a plurality of texture pictures pasted on patch surfaces; superposing said texture development diagrams on each other; and smoothing concentrations of each of said patch surfaces.

15. A program-presenting medium for presenting a formatted computer program to be executed by a computer system for generating a three-dimensional picture by pasting texture pictures on a three-dimensionally-shaped model, said computer program comprising the steps of:

selecting a picture with a highest resolution among a plurality of pictures obtained as a result of photographing an object of measurement from different camera points of view for each of patch surfaces composing a three-dimensional picture;

carrying out texture mapping by applying said selected pictures to said respective patch surfaces as texture pictures;

computing a difference in concentration between adjacent patch surfaces on a border between said patch surfaces; and changing coordinates of end points of either of said patch surfaces to coordinates that minimize a total evaluation value of said differences which is computed.

16. A medium according to claim 15, wherein said step of selecting a picture with a highest resolution for any particular one of said patch surfaces includes the steps of:

comparing a normal vector of said particular patch surface with each of a plurality of photographing visual-point direction vectors; and selecting a picture taken from a photographing visual-point direction forming a smallest angle with said normal vector of said particular patch surface for said particular patch surface.

17. A medium according to claim 15, said computer program further comprising the step of carrying out processing to correct concentrations of a plurality of pictures taken from different camera photographing points of view;

wherein said processing to correct concentrations is carried out by computing an average and a variance of concentrations for each patch-surface unit or each set area unit of said pictures taken from different camera photographing points of view; and performing normalization.

18. A medium according to claim 15, said computer program further comprising the step of carrying out processing to correct a texture-picture shift between patch surfaces, wherein said processing to correct a texture-picture shift is carried out by computing said difference in concentration between adjacent patch surfaces on said border between said patch surfaces; detecting said texture-picture shift; further dividing each of said patch surfaces on the basis of said detected texture-picture shift; and performing re-mapping.

19. A medium according to claim 15, said computer program further comprising the steps of:

detecting a portion of a texture-picture shift between said patch surfaces on the basis of said difference which is computed; and dividing each of said patch surfaces including said portion of said detected texture-picture shift;

wherein said computing is configured to compute a difference in concentration between adjacent said divided patch surfaces on a border between said divided patch surfaces, and said changing coordinates is configured to change coordinates of end points of either of said divided patch surfaces to coordinates that minimize a total evaluation value of said differences which is computed.

20. A medium according to claim 15, said computer program further comprising the step of carrying out processing to correct a texture-picture shift between patch surfaces, wherein said processing to correct a texture-picture shift is carried out by computing an error in concentration between each two adjacent patch surfaces on said border between said patch surfaces for a plurality of patch surfaces composing a three-dimensional picture; performing processing to correct a shift under a condition that an error is greater than a threshold value determined in advance for a largest value among a plurality of computed errors in concentrations; and completing said processing to correct a shift under a condition that errors in concentration which are computed between each two adjacent patch surfaces on said border between said patch surfaces for a plurality of patch surfaces composing a three-dimensional picture all do not exceed said threshold value.

21. A medium according to claim 15, said computer program further comprising the step of carrying out processing to smooth concentrations on a border between patch surfaces, wherein said processing to smooth concentrations is carried out by comparing a normal vector of said particular patch surface with each of a plurality of photographing visual-point direction vectors; selecting a picture taken from a photographing visual-point direction forming a smallest angle with said normal vector of said particular patch surface; pasting said selected picture on said particular patch surface; creating as many texture development diagrams each comprising a texture picture pasted on a plurality of patch surfaces by superposition as a plurality of texture pictures pasted on patch surfaces; superposing said texture development diagrams on each other; and smoothing concentrations of each of said patch surfaces.

* * * * *